United States Patent
Ukita et al.

(10) Patent No.: US 7,321,868 B2
(45) Date of Patent: Jan. 22, 2008

(54) INFORMATION PROCESSING APPARATUS AND METHOD, INFORMATION PROCESSING SYSTEM AND METHOD, AND PROGRAM

(75) Inventors: Yoshitaka Ukita, Tokyo (JP); Yoshikazu Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 1106 days.

(21) Appl. No.: 10/291,685

(22) Filed: Nov. 12, 2002

(65) Prior Publication Data

US 2003/0093336 A1 May 15, 2003

(30) Foreign Application Priority Data

Nov. 13, 2001 (JP) .............................. 2001-347123

(51) Int. Cl.
*G06Q 10/00* (2006.01)
(52) U.S. Cl. ........................................................ 705/28
(58) Field of Classification Search ................. 705/28, 705/26, 27, 22

See application file for complete search history.

(56) References Cited

U.S. PATENT DOCUMENTS

| 6,560,645 B1 * | 5/2003 | Igawa et al. ................. 709/223 |
| 6,985,913 B2 * | 1/2006 | Murata .................... 707/104.1 |

2002/0035516 A1 * 3/2002 Arima ........................ 705/26

FOREIGN PATENT DOCUMENTS

| JP | 2000-113047 | 4/2000 |
| JP | 2000-187694 | 7/2000 |
| JP | 2000-353197 | 12/2000 |
| JP | 2001-109803 | 4/2001 |
| JP | 2001-112857 | 4/2001 |
| JP | 2001-265937 | 9/2001 |
| JP | 2001-290973 | 10/2001 |
| JP | 2001-297252 | 10/2001 |
| JP | 2001-306654 | 11/2001 |

* cited by examiner

*Primary Examiner*—Ronald Laneau
(74) *Attorney, Agent, or Firm*—Oblon, Spivak, McClelland, Maier & Neustadt, P.C.

(57) ABSTRACT

An address on a network of a control center which can order printed books is attached to corresponding electronic book data. When browsing an electronic book at a user terminal, the user accesses the control center by performing a predetermined operation on the basis of the network address. Upon reception of a user ID and the order request for a printed book, the control center searches for the address of the user on the basis of the user ID and, at the same time, searches for a bookstore server having the stock of the requested printed book, thereby placing an order for the printed book to the nearest bookstore server. The bookstore server which accepted the order notifies a printed book deliverer server of the order of the printed book and the address of the user to which the printed book is to be delivered.

3 Claims, 18 Drawing Sheets

FIG. 9

1. <Book-ID>AS-101</Book-ID>
2. <title>I Am A Dog</title>
3. <author>Soseki Akime</author>
4. <Shidoku page>200 page</Shidoku page>
5. <Shidoku 1 time>15 min</Shidoku 1 time>
6. <Shidoku total time>45 min</Shidoku total time>
7. <kounyu URL>http://www.xxbooks.com</kounyu URL>
8. <Shidoku>ON</Shidoku>
9. <document>I am a dog. I have no name yet. ~</document>

FIG. 17

| READER'S EVALUATION (R) | 1 | 2 | 3 | 4 | 5 |
|---|---|---|---|---|---|
| AVERAGE DEVIATION VALUE (D) | LESS THAN 35 | 35 TO LESS THAN 45 | 45 TO LESS THAN 55 | 55 TO LESS THAN 65 | 65 OR MORE |

F I G. 1 8

|  | BOOK A | BOOK B | BOOK C | EVALUATION CAPABILITY VALUE |
|---|---|---|---|---|
| REVIEWER O | 5 | 3 | 4 | 0.67 |
| REVIEWER P | 4 | 2 | 5 | 0.33 |
| REVIEWER Q | 4 | 1 | 3 | 0.67 |
| REVIEWER R | 2 | 1 | — | 1.5 |
| READER'S EVALUATION | 4 | 2 | 4 | |

INFORMATION PROCESSING APPARATUS AND METHOD, INFORMATION PROCESSING SYSTEM AND METHOD, AND PROGRAM

BACKGROUND OF THE INVENTION

The present invention relates generally to an information processing apparatus and method and a program and, more particularly, to an information processing apparatus and method and a program for facilitating the purchase of printed books after the purchase of electronic equivalents.

Electronic books based on digital text data have been coming into widespread use. Generally, electronic books are obtained by converting printed books into digital text data, which are displayed on predetermined electronic book terminal devices. Each electronic book is displayed, page by page, by operating a predetermined key of an electronic book terminal device as if the pages of the printed equivalent were turned over one after the other.

Generally, the electronic books are advantageous in portability over their printed equivalent because, no matter how voluminous they are, they can be accommodated inside hand-held portable electronic book terminal devices. However, if electronic books are read in a manner in which some pages are skipped forward or backward, the reference pages must be electronically marked, which are generally unnecessary with printed books. This inconvenience sometimes makes readers (or users) to turn to the printed equivalent.

However, to get the printed versions of electronic books, the users must go to bookstores or, if they place orders through a network, they must follow the same cumbersome procedures as they bought electronic books.

SUMMARY OF THE INVENTION

It is therefore an object of the present invention to provide an information processing apparatus and method and a program which facilitate, after the purchase of electronic books, the purchase of the printed equivalent by users (or readers).

According to a first aspect of the present invention, there is provided an information processing apparatus comprising:

storage means for storing electronic book data attached with information of an address on a network of a first other information processing apparatus which receives a request for the delivery of a printed book corresponding to an electronic book and a user ID for identifying a user;

display means for displaying the electronic book;

instruction means for instructing the request for the delivery of the printed book corresponding to the electronic book, via a button displayed by the display means along with the electronic book;

transmission means for transmitting, when the request for the delivery of the printed book corresponding to the electronic book is instructed by the instruction means, the request for the delivery of the printed book and the user ID to the first other information processing apparatus corresponding to the address; and reception means for receiving a notice of the reception of the request for the delivery of the printed book from a second other information processing apparatus.

According to a second aspect of the present invention, there is provided an information processing method comprising the steps of:

storing electronic book data attached with information of an address on a network of a first other information processing apparatus which receives a request for the delivery of a printed book corresponding to an electronic book and a user ID for identifying a user;

displaying the electronic book;

instructing the request for the delivery of the printed book corresponding to the electronic book, via a button displayed in the display step along with the electronic book;

transmitting, when the request for the delivery of the printed book corresponding to the electronic book is instructed in the instruction step, the request for the delivery of the printed book and the user ID to the first other information processing apparatus corresponding to the address; and receiving a notice of the reception of the request for the delivery of the printed book from a second other information processing apparatus.

According to a third aspect of the present invention, there is provided a computer program for causing a computer to execute the steps of:

storing electronic book data attached with information of an address on a network of a first other information processing apparatus which receives a request for the delivery of a printed book corresponding to an electronic book and a user ID for identifying a user;

displaying the electronic book;

instructing the request for the delivery of the printed book corresponding to the electronic book, via a button displayed in the display step along with the electronic book;

transmitting, when the request for the delivery of the printed book corresponding to the electronic book is instructed in the instruction step, the request for the delivery of the printed book and the user ID to the first other information processing apparatus corresponding to the address; and receiving a notice of the reception of the request for the delivery of the printed book from a second other information processing apparatus.

In the above-mentioned information processing apparatus and method and program, electronic book data attached with information of an address on a network of a first other information processing apparatus which receives a request for the delivery of a printed book corresponding to an electronic book are stored along with a user ID for identifying each user, the electronic book is displayed, the request for delivering the printed book corresponding to the electronic book is instructed, the request for the delivery of the printed book and the user ID are sent to the first other information processing apparatus corresponding to that address, upon instruction for the request for the delivery of the printed book corresponding to the electronic book, and a notice of the reception of the request for delivery is received from a second other information processing apparatus.

According to a fourth aspect of the present invention, there is provided an information processing apparatus comprising:

reception means for receiving a request for the delivery of a printed book corresponding to an electronic book and a user ID for identifying a user sent from a first other information processing apparatus;

storage means for storing personal information including address information of the user corresponding to the user ID;

stock checking means for checking a plurality of second other information processing apparatuses for a stock of the printed book;

selection means for selecting, on the basis of a result of the stock checking by the stock checking means and the address information of the user corresponding to the user ID, any one of the plurality of second other information processing apparatuses; and transfer means for transferring the request for the delivery of the printed book and the address information of the user to the selected second other information processing apparatus.

According to a fifth aspect of the present invention, there is provided an information processing method comprising the steps of:

receiving a request for the delivery of a printed book corresponding to an electronic book and a user ID for identifying a user sent from a first other information processing apparatus;

storing personal information including address information of the user corresponding to the user ID;

checking a plurality of second other information processing apparatuses for a stock of the printed book;

selecting, on the basis of a result of the stock checking in the stock checking step and the address information of the user corresponding to the user ID, any one of the plurality of second other information processing apparatuses; and transferring the request for the delivery of the printed book and the address information of the user to the selected second other information processing apparatus.

According to a sixth aspect of the present invention, there is provided a computer program for causing a computer to execute the steps of:

receiving a request for the delivery of a printed book corresponding to an electronic book and a user ID for identifying a user sent from a first other information processing apparatus;

storing personal information including address information of the user corresponding to the user ID;

checking a plurality of second other information processing apparatuses for a stock of the printed book;

selecting, on the basis of a result of the stock checking in the stock checking step and the address information of the user corresponding to the user ID, any one of the plurality of second other information processing apparatuses; and transferring the request for the delivery of the printed book and the address information of the user to the selected second other information processing apparatus.

In the above-mentioned information processing apparatus and method and program, a request for delivering a printed book corresponding to an electronic book received from a first other information processing apparatus is received along with a user ID for identifying each user, the personal information including the address information of the user corresponding to the user ID is stored, a plurality of second other information processing apparatuses are checked for the stock of the printed book, and, on the basis of the check results and the address information of the user, any one of the second other information processing apparatuses is selected, and the request for delivering the printed book and the user address information are transferred to the selected second other information processing apparatus.

According to a seventh aspect of the present invention, there is provided an information processing apparatus comprising:

reception means for receiving a request for the delivery of a printed book corresponding to an electronic book and an address of a user transferred from a first other information processing apparatus;

storage means for storing the request for the delivery of the printed book corresponding to the electronic book and the address of the user received by the reception means; and transmission means for transmitting, on the basis of the request for the delivery of the printed book and the address of the user stored in the storage means, a notice indicative of the reception of the request for the delivery of the printed book to a second other information processing apparatus.

According to an eighth aspect of the present invention, there is provided an information processing method comprising the steps of:

receiving a request for the delivery of a printed book corresponding to an electronic book and an address of a user transferred from a first other information processing apparatus;

storing the request for the delivery of the printed book corresponding to the electronic book and the address of the user received in the reception step; and transmitting, on the basis of the request for the delivery of the printed book and the address of the user stored in the storage step, a notice indicative of the reception of the request for the delivery of the printed book to a second other information processing apparatus.

According to a ninth aspect of the present invention, there is provided a computer program for causing a computer to execute the steps of:

receiving a request for the delivery of a printed book corresponding to an electronic book and an address of a user transferred from a first other information processing apparatus;

storing the request for the delivery of the printed book corresponding to the electronic book and the address of the user received in the reception step; and transmitting, on the basis of the request for the delivery of the printed book and the address of the user stored in the storage step, a notice indicative of the reception of the request for the delivery of the printed book to a second other information processing apparatus.

In the above-mentioned information processing apparatus and method and program, the delivery of a printed book corresponding to an electronic book received from a first other information processing apparatus is requested, the address of a requesting user is received, the received request for the delivery of the printed book corresponding to the electronic book and the received address of the user are stored, and, on the basis of the stored request and the user address, a notice indicative of the reception of the request for the delivery of the printed book is sent to a second other information processing apparatus.

According to a tenth aspect of the present invention, there is provided an information processing system composed of a first information processing apparatus, a second information processing apparatus, and a third information processing apparatus, the first information processing apparatus comprising:

first storage means for storing electronic book data attached with information of an address on a network of the second information processing apparatus which receives a request for the delivery of a printed book corresponding to an electronic book and a user ID for identifying a user;

display means for displaying the electronic book;

instruction means for instructing the request for the delivery of the printed book corresponding to the electronic book, via a button displayed by the display means along with the electronic book;

first transmission means for transmitting, when the request for the delivery of the printed book corresponding to the electronic book is instructed by the instruction means, the request for the delivery of the printed book and the user ID to the second information processing apparatus corresponding to the address; and first reception means for receiving a notice of the reception of the request for the delivery of the printed book from the third information processing apparatus;

the second information processing apparatus comprising:

second reception means for receiving the request for the delivery of the printed book corresponding to the electronic book and the user ID for identifying the user sent from the first information processing apparatus;

second storage means for storing personal information including address information of the user corresponding to the user ID;

stock checking means for checking a plurality of the third information processing apparatuses for a stock of the printed book;

selection means for selecting, on the basis of a result of the stock checking by the stock checking means and the address information of the user corresponding to the user ID, any one of the plurality of third information processing apparatuses; and transfer means for transferring the request for the delivery of the printed book and the address information of the user to the selected third information processing apparatus; and the third information processing apparatus comprising:

third reception means for receiving the request for the delivery of the printed book corresponding to the electronic book and the address of the user transferred from the second information processing apparatus;

third storage means for storing the request for the delivery of the printed book corresponding to the electronic book and the address of the user received by the third reception means; and second transmission means for transmitting, on the basis of the request for the delivery of the printed book and the address of the user stored in the third storage means, a notice indicative of the reception of the request for the delivery of the printed book to the first information processing apparatus.

According to an eleventh aspect of the present invention, there is provided an information processing method for an information processing system composed of a first information processing apparatus, a second information processing apparatus, and a third information processing apparatus, the information processing method, in the first information processing apparatus, comprising the steps of:

firstly storing electronic book data attached with information of an address on a network of the second information processing apparatus which receives a request for the delivery of a printed book corresponding to an electronic book and a user ID for identifying a user;

displaying the electronic book;

instructing the request for the delivery of the printed book corresponding to the electronic book, via a button displayed in the display step along with the electronic book;

firstly transmitting, when the request for the delivery of the printed book corresponding to the electronic book is instructed in the instruction step, the request for the delivery of the printed book and the user ID to the second information processing apparatus corresponding to the address; and firstly receiving a notice of the reception of the request for the delivery of the printed book from the third information processing apparatus;

the information processing method, in the second information processing apparatus, comprising the steps of:

secondly receiving the request for the delivery of the printed book corresponding to the electronic book and the user ID for identifying the user sent from the first information processing apparatus;

secondly storing personal information including address information of the user corresponding to the user ID;

checking a plurality of the third information processing apparatuses for a stock of the printed book;

selecting, on the basis of a result of the stock checking in the stock checking step and the address information of the user corresponding to the user ID, any one of the plurality of third information processing apparatuses; and transferring the request for the delivery of the printed book and the address information of the user to the selected third information processing apparatus; and the information processing method, in the third information processing apparatus, comprising the steps of:

thirdly receiving the request for the delivery of the printed book corresponding to the electronic book and the address of the user transferred from the second information processing apparatus;

thirdly storing the request for the delivery of the printed book corresponding to the electronic book and the address of the user received in the third reception step; and secondly transmitting, on the basis of the request for the delivery of the printed book and the address of the user stored in the third storage step, a notice indicative of the reception of the request for the delivery of the printed book to the first information processing apparatus.

According to a twelfth aspect of the present invention, there is provided a computer program for controlling an information processing system composed of a first information processing apparatus, a second information processing apparatus, and a third information processing apparatus, the computer program causing a computer for controlling the information processing system to execute the steps of:

in the first information processing apparatus, firstly storing electronic book data attached with information of an address on a network of the second information processing apparatus which receives a request for the delivery of a printed book corresponding to an electronic book and a user ID for identifying a user;

displaying the electronic book;

instructing the request for the delivery of the printed book corresponding to the electronic book, via a button displayed in the display step along with the electronic book;

firstly transmitting, when the request for the delivery of the printed book corresponding to the electronic book is instructed in the instruction step, the request for the delivery of the printed book and the user ID to the second information processing apparatus corresponding to the address; and firstly receiving a notice of the reception of the request for the delivery of the printed book from the third information processing apparatus;

in the second information processing apparatus, secondly receiving the request for the delivery of the printed book corresponding to the electronic book and the user ID for identifying the user sent from the first information processing apparatus;

secondly storing personal information including address information of the user corresponding to the user ID;

checking a plurality of the third information processing apparatuses for a stock of the printed book;

selecting, on the basis of a result of the stock checking in the stock checking step and the address information of the user corresponding to the user ID, any one of the plurality of third information processing apparatuses; and transferring the request for the delivery of the printed book and the address information of the user to the selected third information processing apparatus; and in the third information processing apparatus, thirdly receiving the request for the delivery of the printed book corresponding to the electronic book and the address of the user transferred from the second information processing apparatus;

thirdly storing the request for the delivery of the printed book corresponding to the electronic book and the address of the user received in the third reception step; and secondly transmitting, on the basis of the request for the delivery of the printed book and the address of the user stored in the third storage step, a notice indicative of the reception of the request for the delivery of the printed book to the first information processing apparatus.

In the above-mentioned information processing system and method and program, a first information processing apparatus stores electronic book data attached with information of an address on a network of a second information processing apparatus which receives a request for the delivery of a printed book corresponding to an electronic book and a user ID for identifying a user, displays the electronic book, instructs the request for the delivery of the printed book corresponding to the electronic book, and, upon instruction of the request for the delivery of the printed book corresponding to the electronic book, sends the request for the delivery of the printed book and the user ID to the second information processing apparatus corresponding to the above-mentioned address, receives a notice indicative of the reception of a delivery request from a third information processing apparatus; the second information processing apparatus receives the request for the delivery of the printed book corresponding to the electronic book and the user ID for identifying the user from the first information processing apparatus, stores personal information including address information of the user corresponding to the user ID, checks a plurality of third information processing apparatuses for the stock of the printed book, selects any one of the third information processing apparatuses on the basis of the results of the checking and the address of the user corresponding to the user ID, transfers the request for the delivery of the printed book and the address information of the user to the selected third information processing apparatus; and the third information processing apparatus receives the request for the delivery of the printed book corresponding to the electronic book and the address information of the user from the second information processing apparatus, stores the received request for the delivery of the printed book corresponding to the electronic book and the address information of the user, and sends a notice indicative of the reception of the request for the delivery of the printed book to the first information processing apparatus on the basis of the stored request for the delivery of the printed book and the stored address information of the user.

BRIEF DESCRIPTION OF THE DRAWINGS

These and other objects of the invention will be seen by reference to the description, taken in connection with the accompanying drawing, in which:

FIG. 9 is a diagram illustrating electronic book data;

FIG. 17 is a diagram illustrating reader's book evaluation; and

FIG. 18 is a diagram illustrating reviewer evaluation method.

DETAILED DESCRIPTION OF THE PREFERRED EMBODIMENTS

Figure 1:
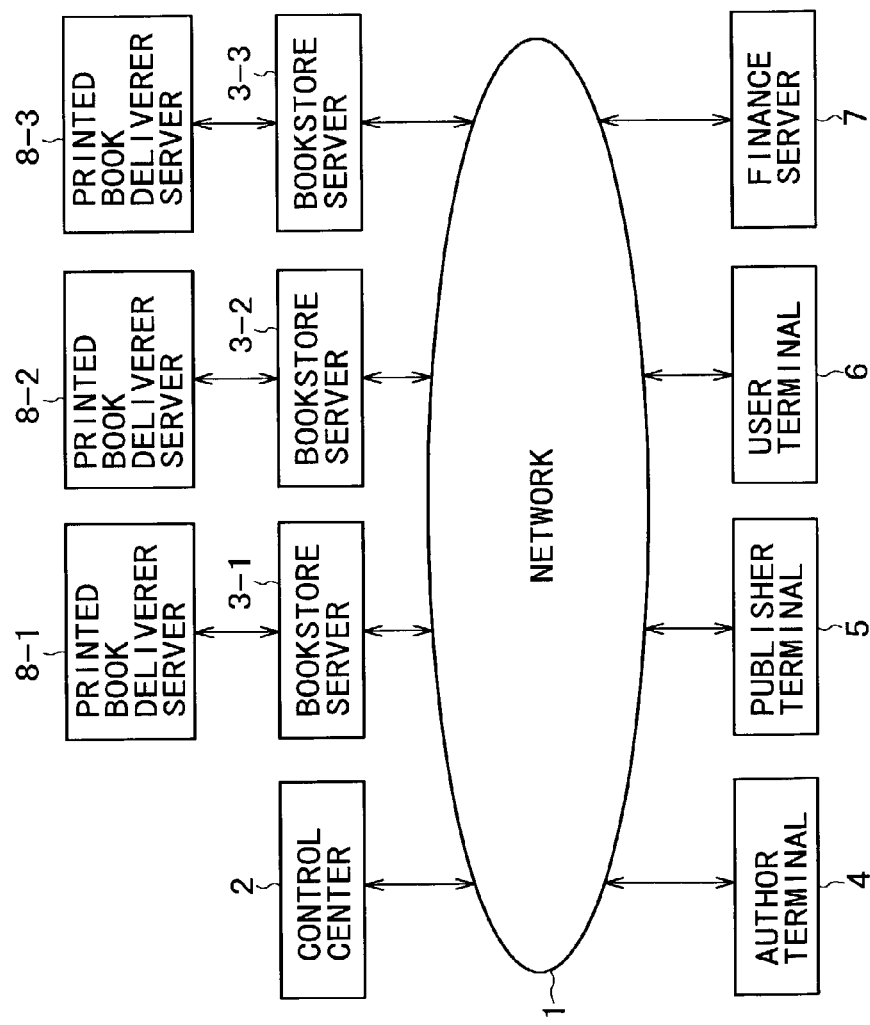
FIG. 1 is a schematic diagram illustrating a configuration of an electronic book sale system to which the present invention is applied.

This invention will be described in further detail by way of example with reference to the accompanying drawings. Now, referring to FIG. 1, there is shown a diagram illustrating an electronic book sale system practiced as one embodiment of the invention. A control center 2 is a computer managed and operated by so-called electronic book intermediary business which gathers electronic books from a publisher server 5 via a network 1 such as the Internet and provides gathered electronic books to bookstore servers 3-1 through 3-3. The control center 2 also accepts a purchase request for printed books from a user terminal 6 via the network 1 and orders one of printed book deliverer servers 8-1 through 8-3 via any of bookstore servers 3-1 through 3-3 that has the stock of the ordered printed books. Further, the control center 2 adds sample reading data to manuscript data supplied from an author terminal 4 and encrypts the resultant data by a contents key to generate electronic books which can be commercialized. The details of the sample reading data will be described later. It should be noted that FIG. 1 shows only one user terminal 6 for the brevity of description; actually, a plurality of user terminals are connected to the network 1.

The bookstore servers 3-1 through 3-3 are computers which are managed and operated by a bookstore proprietor which sells electronic books or printed books to users. In response to an electronic book purchase request from the user terminal 6 through the network 1, the bookstore servers 3-1 through 3-3 allow the downloading of the ordered electronic book and, at the same time, makes a finance server 7 to execute fee-charging processing corresponding to the price of the downloaded product. It should be noted that, unless otherwise noted, the bookstore servers 3-1 through 3-3 are generically referred to as a bookstore server 3. This also applies to the other devices. In the example shown in FIG. 1, the bookstore server 3 is three in number; it will be apparent that more than 3 bookstore servers 3 may be installed.

The author terminal 4 is a computer which is used by the author of each electronic book, who applies the contribution of manuscript data representing his literary work to a publisher server 5 managed and controlled by a publisher with which the author binds himself through the network 1 and, at the same time, transfers the manuscript data to the control center 2.

The publisher server 5 is a computer which is managed and operated by a manufacturer of electronic books or printed books and sends the manuscript data contributed from the author terminal 4 through the network 1 to the control center 2 to commercialize the manuscript data as an electronic book (namely manufacture as an electronic book, which will be described later) and, at the same time, causes the finance server 7 to execute the fee-charging processing as the payment for the manuscript.

The user terminal 6 is a computer which is used by a user (or a reader) who intends to purchase electronic books or printed books. The user terminal 6 displays each electronic book purchased through the network 1 so that it can be previewed by the user.

The finance server 7 is a computer which executes fee-charging processing between the control center 2, the bookstore server 3, the author terminal 4, the publisher server 5, and the user terminal 6, which is managed and operated by a contract financial institution.

Figure 2:
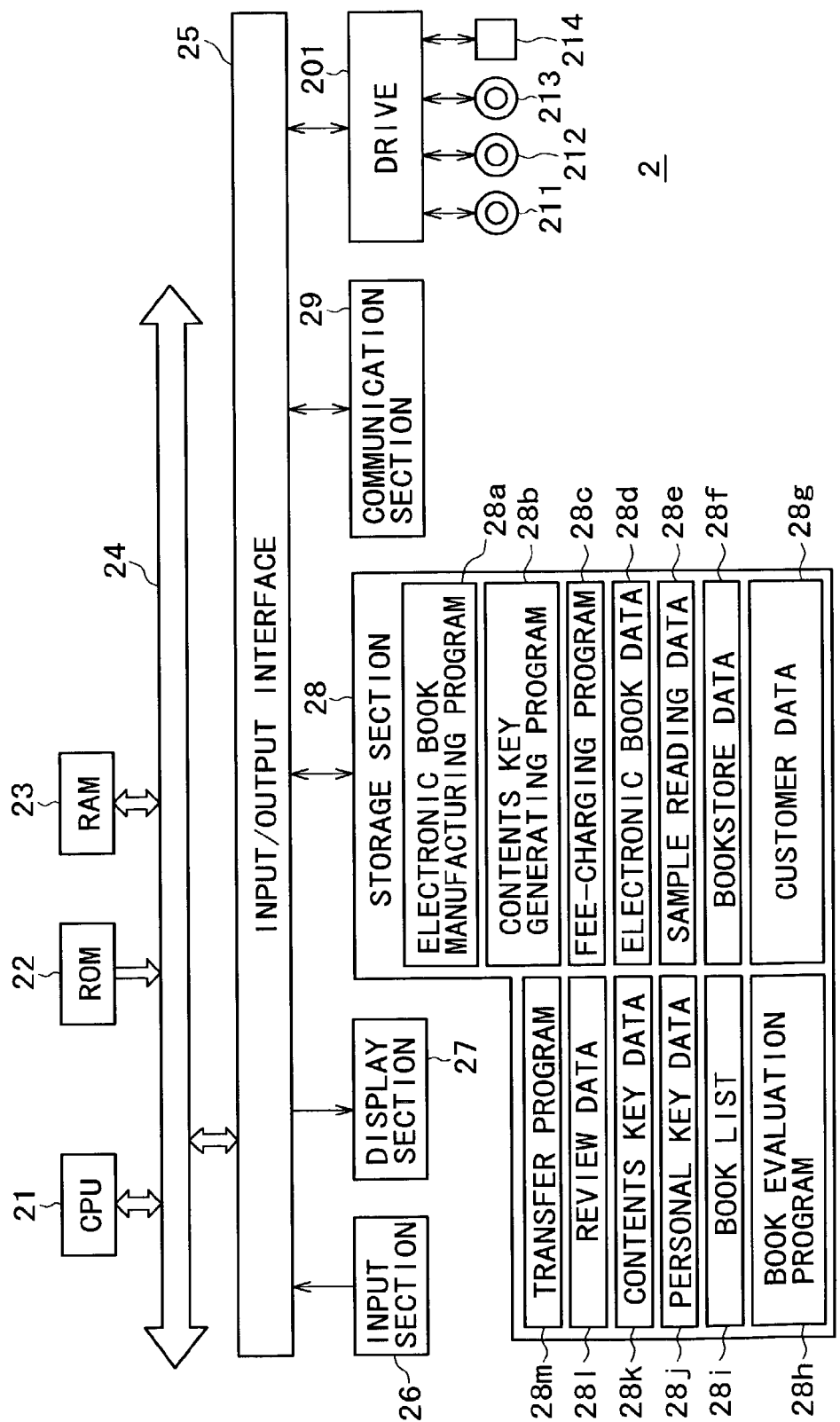
FIG. 2 is a block diagram illustrating a configuration of a control center shown in FIG. 1.

The following describes a configuration of the control center 2 with reference to FIG. 2. A CPU (Central Processing Unit) 21 actually executes application programs to be described later and an OS (Operating System). A ROM (Read Only Memory) 22 generally stores the basic static data among the programs and computational parameters for use by the CPU 21. A RAM (Random Access Memory) 23 stores the programs for use in the execution by the CPU 21 and the parameters which change from time to time during the execution. These components are interconnected by a host bus 24 constituted by a CPU bus or a memory bus. The CPU 21 reads programs and data from a magnetic disc 211, an optical disc 212, a magneto-optical disc 213, or a semiconductor memory 214 connected through an input/output interface 25 and a drive 201 and store them into the RAM 23 for execution or records various programs and data.

The host bus 24 is connected to the input/output interface 25 via a PCI (Peripheral Component Interconnect/Interface) bus via a bridge (not shown).

An input/output section 26 is constituted by a keyboard or a mouse and operated by the user when entering various commands into the CPU 21 and performing pointing operation and selection on the screen shown on a display section 27. The display section 27 is constituted by a CRT (Cathode Ray Tube) or a LCD (Liquid Crystal Display) and displays various pieces of information in text or image.

A storage section 28 is a HDD (Hard Disc Drive) or a FDD (Flexible Disc Drive) for example which drive a hard disc and a flexible disc respectively to record programs to be executed by the CPU 21 and various data to the disc or read them therefrom (in the case of programs, they are first installed in the storage section 28 for execution). The storage section 28 stores an electronic book manufacturing program 28a, a contents key generating program 28b, a fee-charging program 28c, an electronic book data 28d, a sample reading data 28e, a bookstore data 28f, a customer data 28g, a book evaluation program 28h, a book list 28i, a personal key data 28j, a contents key data 28k, a review data 28l, and a transfer program 28m.

Upon reception of manuscript data from the author terminal 4, the electronic book manufacturing program 28a adds the sample reading data 28e thereto and encrypts the resultant data with a contents key to generate the electronic book data 28d. At this moment, the electronic book manufacturing program 28a registers the electronic book data 28d into the book list 28i.

The contents key generating program 28b generates a contents key unique to manuscript data and registers the generated contents key as contents key data 28k. To be more specific, the contents key generating program 28b computes a predetermined function with the total number of characters of the manuscript data and the title text data as parameters and uses the text data obtained by this computation as the contents key.

The fee-charging program 28c causes the finance server 7 to execute the fee-charging processing associated with the processing of the control center 2.

The electronic book data 28d are obtained by adding the sample reading data 28e to the manuscript data and encrypting the resultant data by a contents key, which are described in XML (Extended Markup Language). It should be noted that the description of the electronic book data 28d may also be made in another language than XML; for example, HTML (Hyper Text Markup Language).

The sample reading data 28e are data with sample reading conditions written for trying to read the electronic book data 28d before the user purchases them, the conditions including the number of pages which can be tried to read, the time in which sample reading is permitted for one time, and the total time in which sample reading is permitted. It should be noted that the sample reading data 28e will be detailed later.

The bookstore data 28f are obtained by summarizing the bookstore servers 3 accessible on the network 1 in correspondence with their identifiable IDs. For example, if the purchase of a printed book is requested from the user terminal 6, the bookstore data 28f are used to search the bookstore server 3 with which the user is under contract when checking the stock of the requested printed book.

Figure 3:
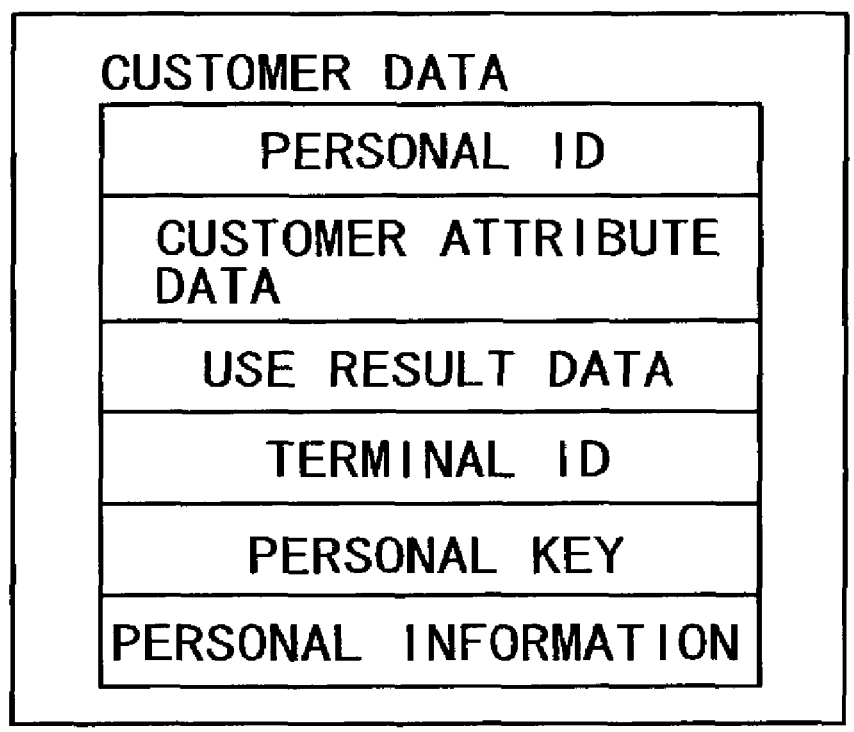
FIG. 3 is a diagram illustrating customer data.

The customer data 28g are personal data of each user who becomes a customer registered beforehand in the control center 2 on the network 1 as shown in FIG. 3 and include personal ID, customer attribute data, use result data, terminal ID, personal key, and personal information. The personal ID is an ID unique to each user for his identification. The customer attribute data identify such customer attributes as whether this customer is a periodically subscribing customer, has purchased books (electronic or printed book) in the past, and so on. The use result data indicate the information about what books the customer has purchased in the past. The terminal ID identifies the user terminal 6 for use by that user. In this case, the processing via the network 1 for ordering electronic or printed books is performed on the premise that each user is using the registered user terminal 6 and can be executed only when there is a match between personal ID and terminal ID. The personal key data indicate a key for decryption corresponding to each personal ID and are used to encrypt a contents key. The personal information includes the address, telephone number, card number, and so on of each customer and is used for the arrangements of delivering printed books for example.

The book evaluation program 28h obtains the reader's objective evaluation by computation based on the book reading data indicative of how each electronic book has been read by each user at the user terminal 6 and compares the obtained evaluation with the review data 28*l* recorded with reviews by plural reviewers to determine, as evaluation capability values, how close the review of each reviewer is to the review of the user who is the reader. It should be noted that the reviewer evaluation processing of the book evaluation program 28*h* will be described later.

The transfer program 28*m* transfers the specified electronic book data 28*d* to the user terminal 6 upon request from the bookstore server 3.

A communication section 29 is constituted by a modem for example and connects to the network 1 via a telephone line for example to transfer data with other computers as instructed by the CPU 21.

Figure 4:
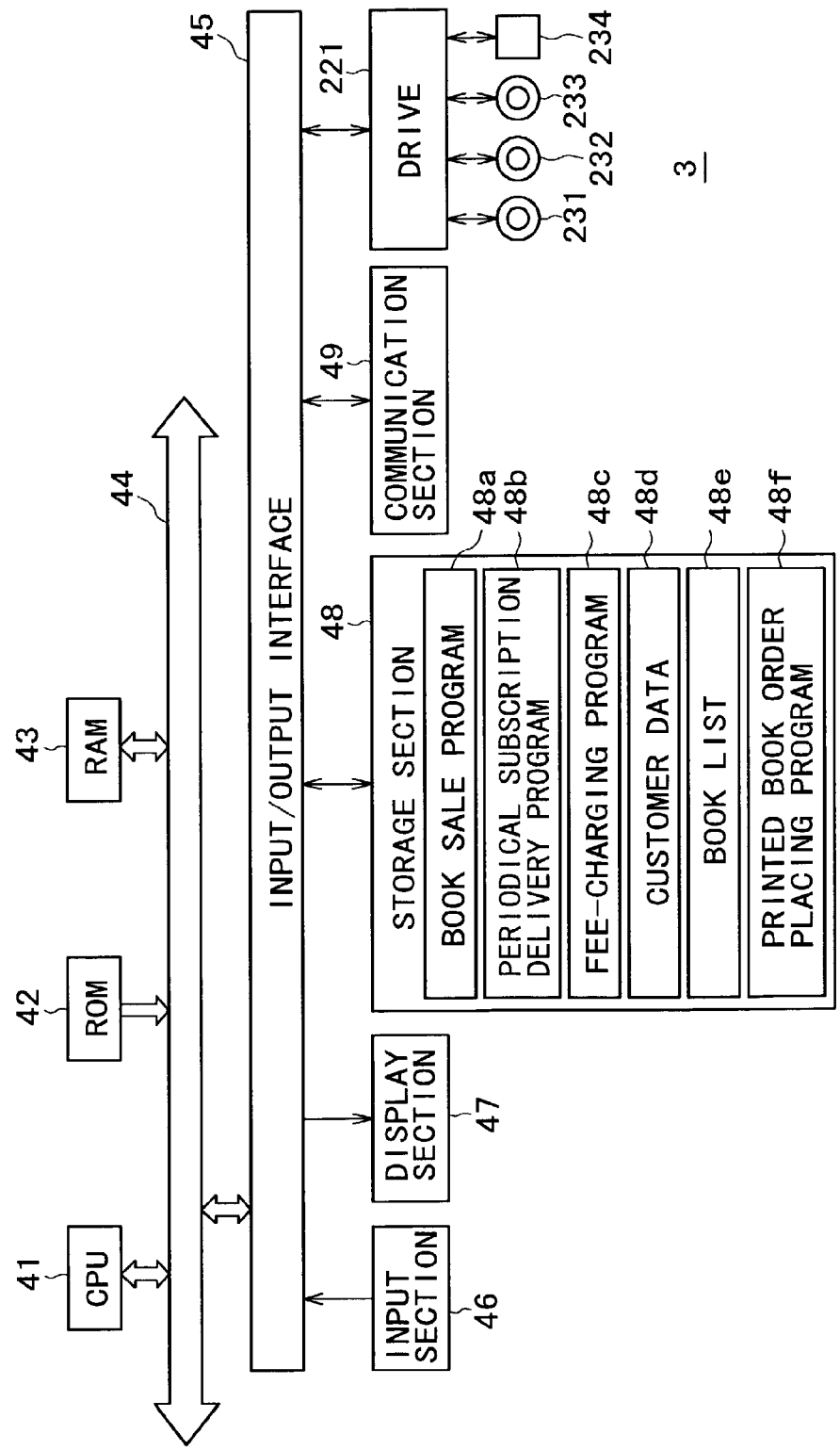
FIG. 4 is a block diagram illustrating a configuration of bookstore server shown in FIG. 1.

The following describes the bookstore server 3 with reference to FIG. 4.

The bookstore server 3 is a computer, which is basically the same in configuration as the control center 2 described with reference to FIG. 2. Namely, a CPU 41, a ROM 42, a RAM 43, a host bus 44, an input/output interface 45, an input section 46, a display section 47, a storage section 48, a communication section 49, a drive 221, a magnetic disc 231, an optical disc 232, a magneto-optical disc 233, and a semiconductor memory 234 of the bookstore server 3 are the same in function as the CPU 21, the ROM 22, the RAM 23, the host bus 24, the input/output interface 25, the input section 26, the display section 27, the storage section 28, the communication section 29, the drive 201, the magnetic disc 211, the optical disc 212, the magneto-optical disc 213, and the semiconductor memory 214 of the control center 2 shown in FIG. 2. The bookstore server 3 is different from the control center 2 in the programs installed and the data set in the storage section 48 beforehand.

Therefore, the following omits the description of the CPU 41, the ROM 42, the RAM 43, the host bus 44, the input/output interface 45, the input section 46, the display section 47, the storage section 48, the communication section 49, the drive 221, the magnetic disc 231, the optical disc 232, the magneto-optical disc 233, and the semiconductor memory 234. The following describes the programs and data stored in the storage section 48.

When the purchase of an electronic book or a printed book is requested from the user terminal 6 via the network 1, a book sale program 48*a* searches a book list 48*e* for the requested electronic book and supplies the retrieved electronic book to the user terminal 6, thus executing its sale processing. At this moment, the book sale program 48*a* starts up a fee-charging program 48*c* to cause the finance server 7 to execute the fee-charging processing associated with the sale of the electronic book via the network 1.

A periodical subscription delivery program 48*b* delivers, at certain time intervals, electronic books to the user terminal 6 of the user who periodically subscribes to electronic books.

The fee-charging program 48*c* performs electronic book's fee payment processing with the finance server 7 via the network 1 when the book sale program 48*a* executes electronic book sale processing.

A customer data 48*d* are the data of the customers (or users or readers) who are under contract with the bookstore managing the bookstore server 3, of the data managed by the control center 2, the format of the data being the same as those shown in FIG. 3.

A book list 48*e* is the information indicative of a list of electronic books and printed books sold by the bookstore managing the bookstore server 3 and updated by the control center 2 at predetermined time intervals or every time newly published books are registered. The book list 48*e* is read when the book sale program 48*a* executes book sale processing and sent to the user (or customer), on the basis of which the user can reference the purchasable books at the user terminal 6.

When an order is placed on a printed book from the user terminal 6, a printed book order placing program 48*f* sends the printed book specified at the user terminal 6 and the personal information included in the customer data 48*d* from the control center 2 to the printed book deliverer server 8 and sends a command to deliver the ordered book.

Figure 5:
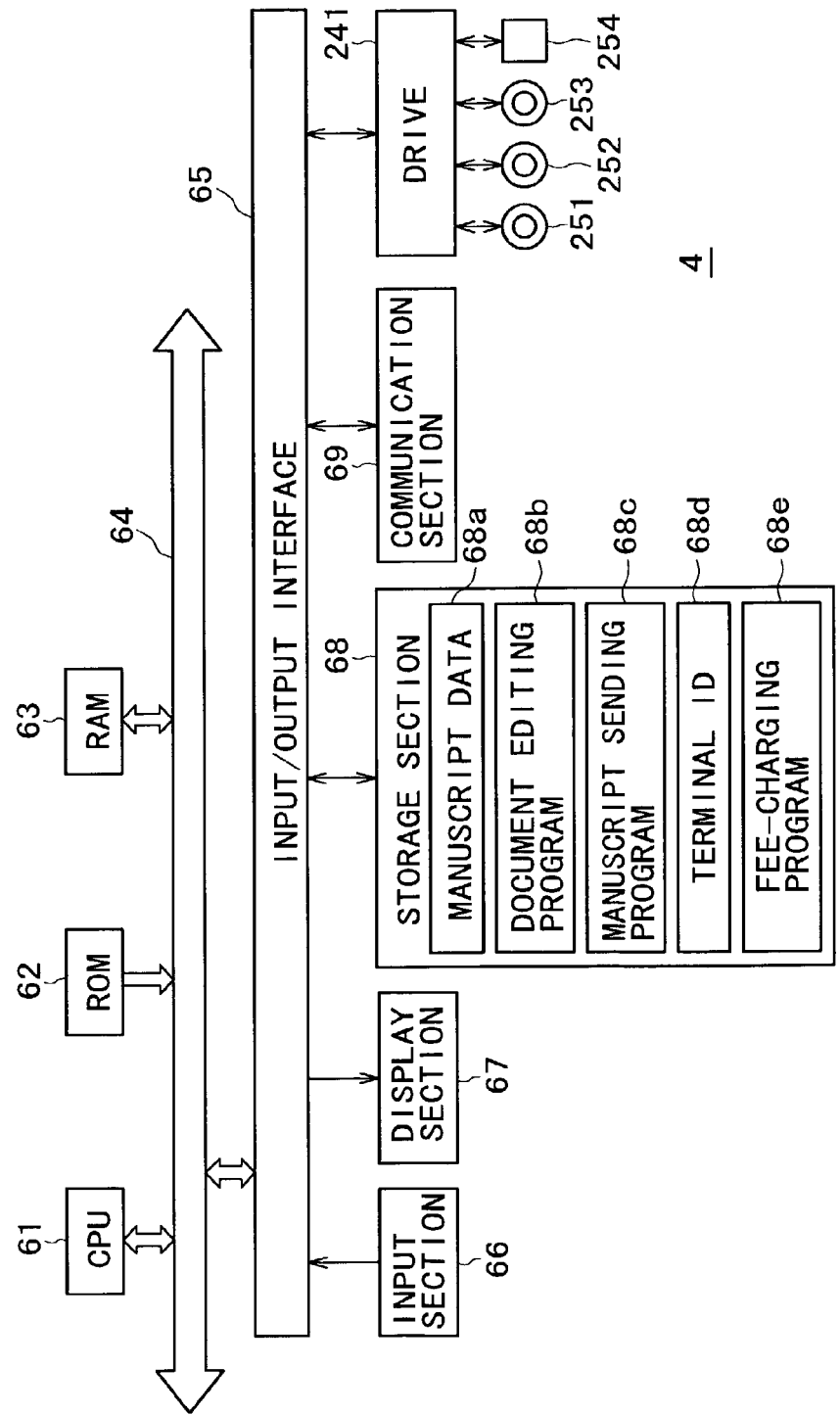
FIG. 5 is a block diagram illustrating a configuration of an author terminal shown in FIG. 1.

The following describes a configuration of the author terminal 4 with reference to FIG. 5.

The author terminal 4 is a computer of which basic configuration is substantially the same as the control center 2 described with reference to FIG. 2 or the bookstore server 3 described with reference to FIG. 4. Namely, a CPU 61, a ROM 62, a RAM 63, a host bus 64, an input/output interface 65, an input section 66, a display section 67, a storage section 68, a communication section 69, a drive 241, a magnetic disc 251, an optical disc 252, a magneto-optical disc 253, and a semiconductor memory 254 of the author terminal 4 are the same in function as the CPU 21, the ROM 22, the RAM 23, the host bus 24, the input/output interface 25, the input section 26, the display section 27, the storage section 28, the communication section 29, the drive 201, the magnetic disc 211, the optical disc 212, the magneto-optical disc 213, and the semiconductor memory 214 of the control center 2. The author terminal 4 is different from the control center 2 in the programs installed in and the data set to the storage section 68 beforehand.

Therefore, the following omits the description of the CPU 61, the ROM 62, the RAM 63, the host bus 64, the input/output interface 65, the input section 66, the display section 67, the storage section 68, the communication section 69, the drive 241, the magnetic disc 251, the optical disc 252, the magneto-optical disc 253, and the semiconductor memory 254. The following describes the programs and data stored in the storage section 68.

Manuscript data 68*a* are text data generated by an author by use of a document editing program 68*b* for example. These manuscript data 68*a* are the original manuscript of an electronic book or a printed book. A manuscript sending program 68*c* accesses the publisher server 5 and control center 2 by use of an terminal ID 68*d* identifying its terminal to send the manuscript data 68*a*. At this moment, the manuscript sending program 68*c* makes a fee-charging program 68*e* execute the fee-charging processing on the compensation of the manuscript data.

Figure 6:
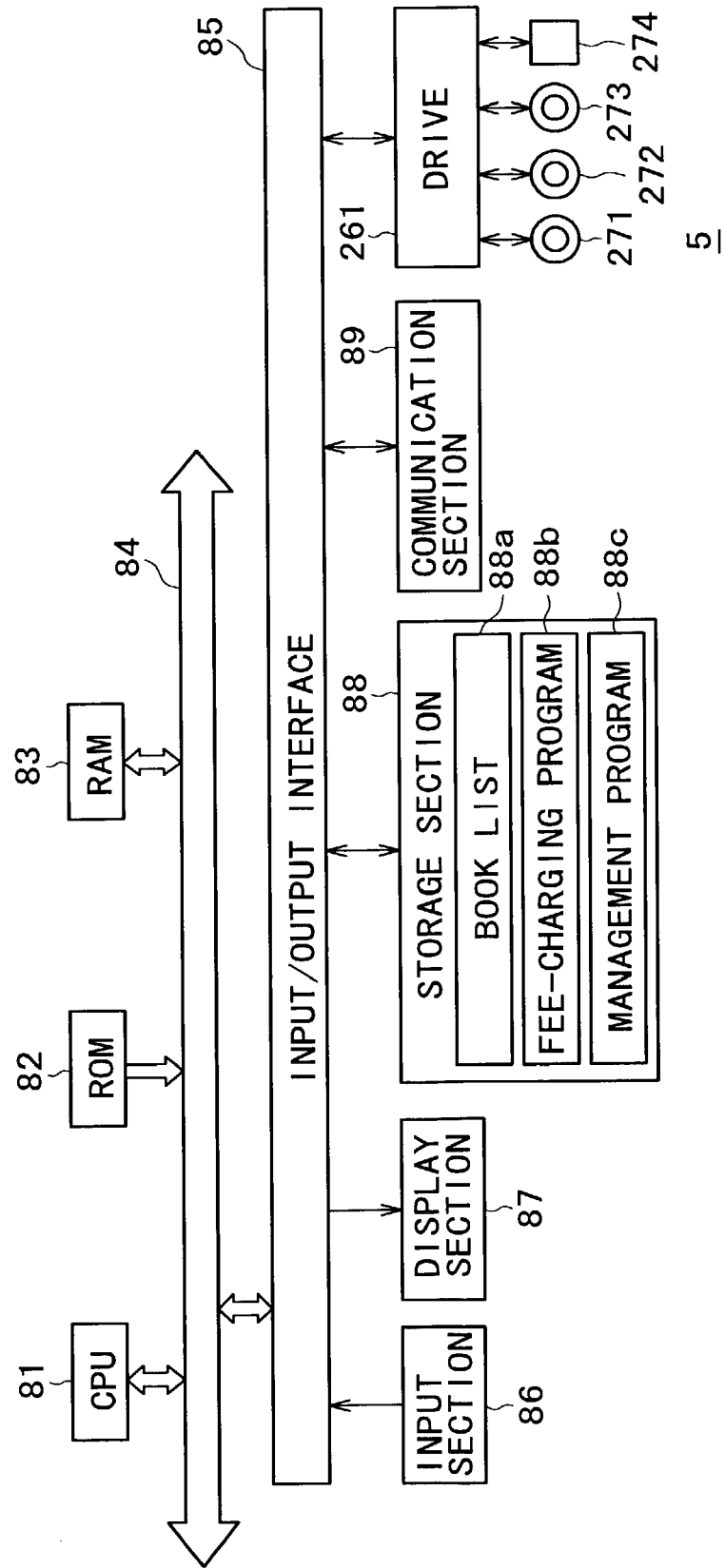
FIG. 6 is a block diagram illustrating a configuration of a publisher server shown in FIG. 1.

The following describes a configuration of the publisher server 5 with reference to FIG. 6.

The publisher server 5 is a computer of which basic configuration is substantially the same as the control center 2 described with reference to FIG. 2, the bookstore server 3 described with reference to FIG. 4, or the author terminal 4 described with reference to FIG. 5. Namely, a CPU 81, a ROM 82, a RAM 83, a host bus 84, an input/output interface 85, an input section 86, a display section 87, a storage section 88, a communication section 89, a drive 261, a magnetic disc 271, an optical disc 272, a magneto-optical disc 273, and a semiconductor memory 274 of the publisher server 5 are the same in function as the CPU 21, the ROM 22, the RAM 23, the host bus 24, the input/output interface 25, the input section 26, the display section 27, the storage section 28, the communication section 29, the drive 201, the magnetic disc 211, the optical disc 212, the magneto-optical disc 213, and the semiconductor memory 214 of the control center 2. The publisher server 5 is different from the control center 2 in the programs installed in and the data set to the storage section 88 beforehand.

Therefore, the following omits the description of the CPU 81, the ROM 82, the RAM 83, the host bus 84, the input/output interface 85, the input section 86, the display section 87, the storage section 88, the communication section 89, the drive 261, the magnetic disc 271, the optical disc 272, the magneto-optical disc 273, and the semiconductor memory 274. The following describes the programs and data stored in the storage section 88.

A book list 88*a* is the data which record, as a list, all electronic books and printed books published by a publishing company managing and operating the publisher server 5. When a manuscript is received from the author terminal 4, the manuscript data are updated to the book list 88*a*. In response to the reception of the manuscript data, a fee-charging program 88*b* causes the finance server 7 to execute fee-charging processing. A management program 88*c* manages the operation of the publisher server 5 and, if there are manuscript data to be contributed from the author terminal 4, issues a command for transferring the manuscript data to the control center 2 and controls the fee-charging program 88*b* to perform fee-charging processing on the contribution of the manuscript data.

Figure 7:
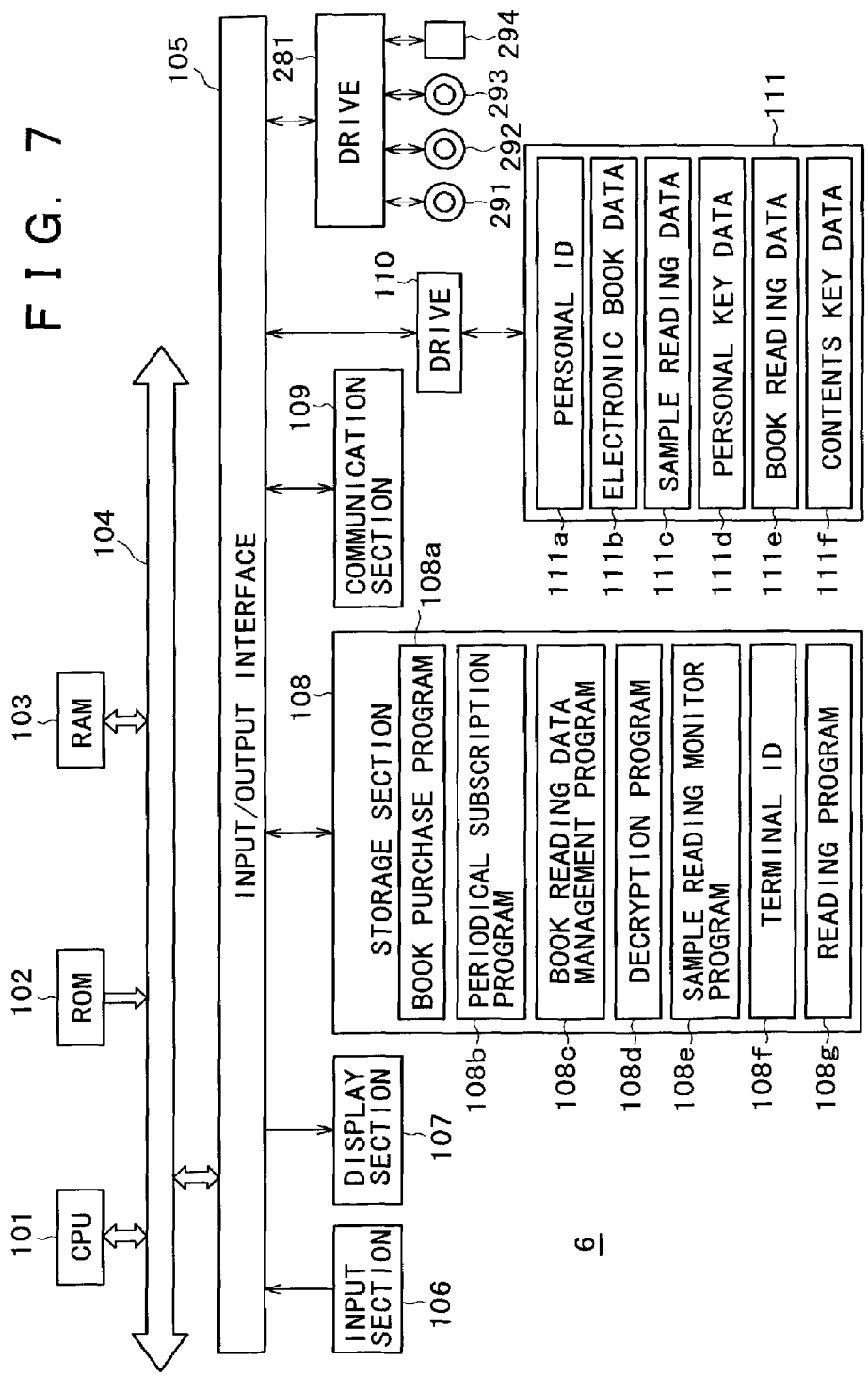
FIG. 7 is a block diagram illustrating a user terminal shown in FIG. 1.

The following describes the user terminal 6 with reference to FIG. 7.

The user terminal 6 is a computer, of which basic configuration is substantially the same as the control center 2 described with reference to FIG. 2, the bookstore server 3 described with reference to FIG. 4, the author terminal 4 described with reference to FIG. 5, and the publisher server 5 described with reference to FIG. 6. Namely, a CPU 101, a ROM 102, a RAM 103, a host bus 104, an input/output interface 105, an input section 106, a display section 107, a storage section 108, a communication section 109, a drive 28*l*, a magnetic disc 291, an optical disc 292, a magneto-optical disc 293, and a semiconductor memory 294 of the user terminal 6 are the same in function as the CPU 21, the ROM 22, the RAM 23, the host bus 24, the input/output interface 25, the input section 26, the display section 27, the storage section 28, the communication section 29, the drive 201, the magnetic disc 211, the optical disc 212, the magneto-optical disc 213, and the semiconductor memory 214 of the control center 2. The user terminal 6 is different from the control center 2 in the programs installed in and the data set to the storage section 108 and a semiconductor memory 111 loaded in a drive 110.

Therefore, the following omits the description of the CPU 101, the ROM 102, the RAM 103, the host bus 104, the input/output interface 105, the input section 106, the display section 107, the storage section 108, the communication section 109, the drive 28*l*, the magnetic disc 291, the optical disc 292, the magneto-optical disc 293, and the semiconductor memory 294. The following describes the programs and data stored in the storage section 108, the drive 110, and the semiconductor memory 111.

A book purchase program 108*a* is executed when the purchase (including the sample reading) of a book is requested by the user to execute printed book purchase processing (including the transfer of an electronic book for sample reading) on the control center 2 or the bookstore server 3 via the network 1. When the electronic book is purchased or downloaded for sample reading, the book purchase program 108*a* stores the purchased or downloaded electronic book into the semiconductor memory 111 loaded in the drive 110 as electronic book data 111*b*. A periodical subscription program 108*b* executes the purchase of periodically purchasing electronic books at predetermined time intervals.

A book reading data management program 108*c* counts the number of turned-over pages, the number of times the electronic book has been read, the number of times the book has been lent out, and the number of pages which have been turned over two or more times when the user executed a reading program 108*g* to read the electronic book data 111*b* downloaded into the semiconductor memory 111 and stores resultant book reading data 111*e* into the semiconductor memory 111.

When the reading program 108*g* displays the electronic book data 111*b*, a decryption program 108*d* decrypts the contents key encrypted by the personal key stored in contents key data 111*f* and, by use of the decrypted contents key, decrypts the encrypted electronic book data.

A sample reading monitor program 108*e* is started up for browsing electronic book data 111*b* when the reading program 108*g* has not officially purchased the electronic book data 111*b*, sets the electronic book data 111*b* to a state in which they can be browsed only under predetermined conditions on the basis of the sample reading data, and, if these conditions are not satisfied, disables the browsing of the electronic book data by the reading program 108*g*. To be more specific, the total number of pages which can be turned over for sample reading, the duration of time in which pages can be turned over by one sample reading, and a total time in which sample reading is permitted are set as the predetermined conditions. It is determined whether these conditions are satisfied. If any one of these conditions is found not satisfied, the sample reading monitor program 108*e* disables the sample reading.

An ID terminal 108*f* is an ID unique to the user terminal 6 which is used for authentication when downloading the electronic book data 111*b* from the control center 2. The reading program 108*g* reads the electronic book data 111*b* from the semiconductor memory 111 and displayed the electronic book data 111*b* onto the display section 107.

The drive 110 can accommodate the semiconductor memory 111 in a detachable manner and, as instructed by the CPU 101, records predetermined programs and data into the semiconductor memory 111 or reads them therefrom. The semiconductor memory 111 is as small-sized, portable recording medium; for example, the Memory Stick (trademark) of Sony Corporation, the applicant hereof.

A personal ID 111*a* is the ID unique to each user and the data to be stored in every semiconductor memory 111 for use in purchasing electronic books by the book purchase program 108*a* with the terminal ID 108*f*. The sample reading data 111*c* are data recorded with sample reading conditions and are recorded by the sample reading monitor program 108*e*.

Figure 8:
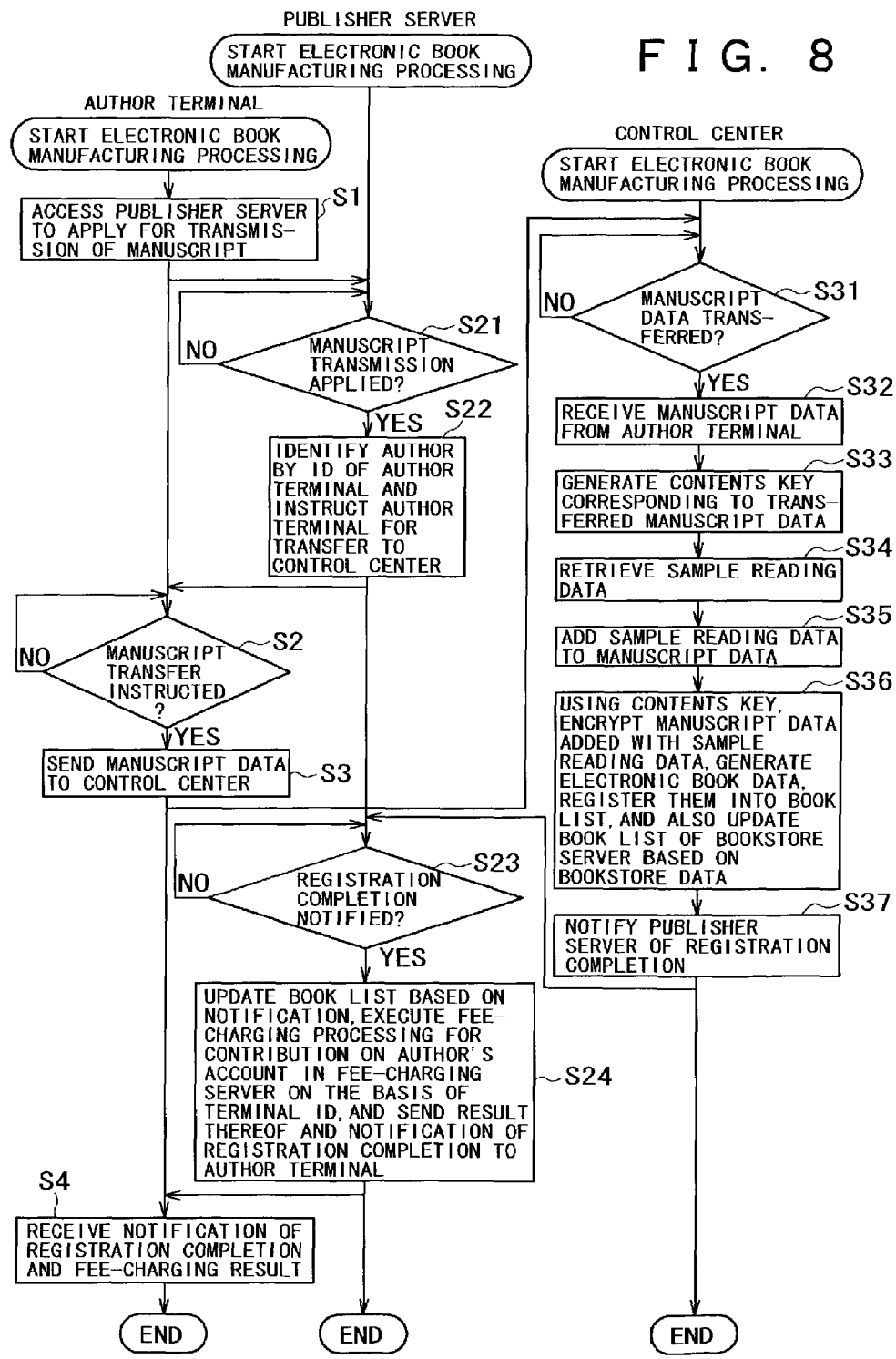
FIG. 8 is a flowchart describing electronic book manufacturing processing.

The following describes processing in which manuscript data are transferred from the author terminal 4 to the control center 2 (namely, manuscript data are contributed) to be manufactured as an electronic book (or to be configured as electronic book data which can be delivered as electronic books) with reference to the flowchart shown in FIG. 8.

In step S1, the manuscript sending program 68*c* controls the communication section 69 to access the publisher server 5 via the network 1 to perform authentication by use of the terminal ID 68*d* and apply the sending of manuscript data.

In step S21, the management program 88*c* of the publisher server 5 controls the communication section 89 to determine whether the sending of manuscript data has been applied from the author terminal 4 and repeats this process until the application comes. For example, when the sending is applied by the process of step S1, the procedure goes to step S22.

In step S22, the management program 88c controls the communication section 89 to receive the terminal ID 68d sent along with the application for the manuscript transmission sent from the author terminal 4 and identifies, on the basis of the terminal ID 68d, the author terminal 4 (or determines from which author the transmission has come) to identify the author of the manuscript data 68a, thereby instructing the transfer of the manuscript data 68a to the control center 2.

In step S2, the manuscript sending program 68c determines whether the transfer of manuscript data to the control center 2 has been instructed by the publisher server 5 and repeats this process until the instruction of the transfer of manuscript data comes. In this case for example, the transfer of the manuscript data 68a has been instructed by the process of step S22, so that the manuscript sending program 68c reads the manuscript data 68a in step S3 and controls the communication section 89 to transfer the manuscript data 68a to the control center 2 via the network 1.

In step S31, the electronic book manufacturing program 28a of the control center 2 determines whether manuscript data have been transferred and repeats this process until the manuscript data have come. For example, when the manuscript data have been transferred by the process of step S3, it is determined that the transferred manuscript data have come and the procedure goes to step S32.

In step S32, the electronic book manufacturing program 28a controls the communication section 29 to receive manuscript data from the author terminal 4 and stores the received data into the storage section 28. In step S33, the electronic book manufacturing program 28a controls the contents key generating program 28b to generate a contents key corresponding to the received manuscript data and registers the generated contents key into the contents key data 28k. In step S34, the electronic book manufacturing program 28a reads the sample reading data 28e corresponding to the received manuscript data.

In step S35, the electronic book manufacturing program 28a adds the retrieved sample reading data 28e to the manuscript data and converts the resultant manuscript data into the electronic book data of XML format (namely, the sample reading data 28e are added to the header of an electronic book of XML format for the conversion into electronic book data). To be more specific, by this process, the data of XML format as shown in FIG. 9 are generated. Namely, on line 1, "<Book-ID>AS-101</Book-ID>" is described, which indicates that the value between "<Book-ID>" and "</Book-ID>" is the ID for identifying the electronic book. In this case, "AS-101" indicates the ID for identifying the electronic book. On line 2, "<title>I Am A Dog</title>" is described, which indicates that "I Am A Dog" is the title of the electronic book. On line 3, "<author>Soseki Akime</author>" is described, the character strings between <author>and </author>indicating the author of the electronic book, "Soseki Akime" in this case. On line 4, "<Shidoku page>200 page</Shidoku page>" is described, the character strings between "<Shidoku page>" and "</Shidoku page>" indicating the number of pages permitted for sample reading of the electronic book, "200 pages" in this case. On line 5, "<Shidoku 1 time>15 min</Shidoku 1 time>" is described, the character strings between "<Shidoku 1 time>" and "</Shidoku 1 time>" indicating a duration of time in which the sample reading of the electronic book is permitted in one sample reading session, "15 minutes" in this case. On line 6, "<Shidoku total time>45 min</Shidoku total time>" is described, the character strings between "<Shidoku total time>" and "</Shidoku total time>" indicating the total duration of time in which the sample reading of the electronic book is permitted, "45 minutes" in this case. On line 7, "<kounyu URL>http://www.xxbooks.com</kounyu URL>" is described, the character string between "<kounyu URL>" and "</kounyu URL>" indicating the URL (Universal Resource Locator) of the control center 2 or bookstore server 3 from which the electronic book can be purchased, "http://www.xxbooks.com" in this case. It should be noted that, at the user terminal 6, the reading program 108gdisplays a button (or, an icon) which is pressed for purchasing an electronic book. When this button is pressed, the book purchase program 108a accesses the control center 2 on the basis of this URL. Details will be described later. On line 8, "<Shidoku>ON</Shidoku>" is described, "ON" indicating that sample reading is set; namely, this electronic book is before purchase. It should be noted that this sample reading setting is cleared by the book purchase program 108a of the user terminal 6 when the purchase of the electronic book data 111b has been completed. Therefore, in the state where the book manufacturing processing has been completed, the sample reading setting is "ON". On line 9, "<document>I am a dog. I have no name yet. ~</document>" is described, the character strings between "<document>" and "/<document>" indicating the actual manuscript data. Of the above-mentioned character strings, line 4 through line 8 constitute the sample reading data.

Now, referring to FIG. 8 again, the description of the electronic book manufacturing processing will be continued.

In step S36, the electronic book manufacturing program 28a reads the corresponding contents key from the contents key data 28k, encrypts the manuscript data attached with the sample reading data 28e, generates the electronic book data 28d, registers the information corresponding to the electronic book data 28d into the book list 28i, and controls the communication section 29 to search for a bookstore which sells the electronic book data 28d on the basis of the bookstore data 28f, and updates the book list 48e of the corresponding bookstore server 3. To be more specific, the electronic book manufacturing program 28a controls the communication section 29 to instruct, via the network 1, the bookstore server 3 to perform update processing on the basis of the update information of the book list 48e. Consequently, the bookstore server 3 updates the book list 48e on the basis of the update processing instruction with the update information received by the communication section 49 via the network.

In step S37, the electronic book manufacturing program 28a controls the communication section 29 to notify the publisher server 5 of the manufacture of the manuscript data as an electronic book and the registration thereof.

In step S23, the management program 88c determines whether the registration has been completed and repeats this process until the registration has been completed, namely, until the completion of the registration is notified by the control center 2. For example, by processing in step S37, when the completion of the registration has been notified, it is determined that the registration has been completed. The procedure goes to step S25.

In step S24, the management program 88c updates the book list 88a on the basis of the notification of the completed registration and controls the fee-charging program 88b on the basis of the terminal ID 68d of the author terminal 4 which contributed the manuscript data to cause the finance server 7 on the network 1 to execute the fee-charging processing for the contributed manuscript data, sending the result of the fee-charging processing and the information that the manuscript data have been registered to the author terminal 4.

In step S4, the author terminal 4 receives the notification that the manuscript data have been registered as an electronic book and the notification that the fee-charging processing has been executed for the manuscript data.

By the above-mentioned processing, the manuscript created by the author is manufactured at the control center 2 as an electronic book, becomes sellable on the network 1, and, at the same time, fee-charging processing is executed on the compensation for the manuscript which occurs as a result of manuscript contribution. After the completion of the fee-charging processing, the author may also operate his author terminal 4 to execute the fee-charging program 68*e* to access the finance server 7 to separately confirming that the fee-charging processing has been executed for the manuscript compensation. Also, the description of the electronic book data 28*d* which is generated by the above-mentioned electronic book manufacturing processing is not limited to the configuration described with reference to FIG. 9; namely, this description may be of any configuration as far as it is constituted by manuscript data and sample reading data.

Figure 10:
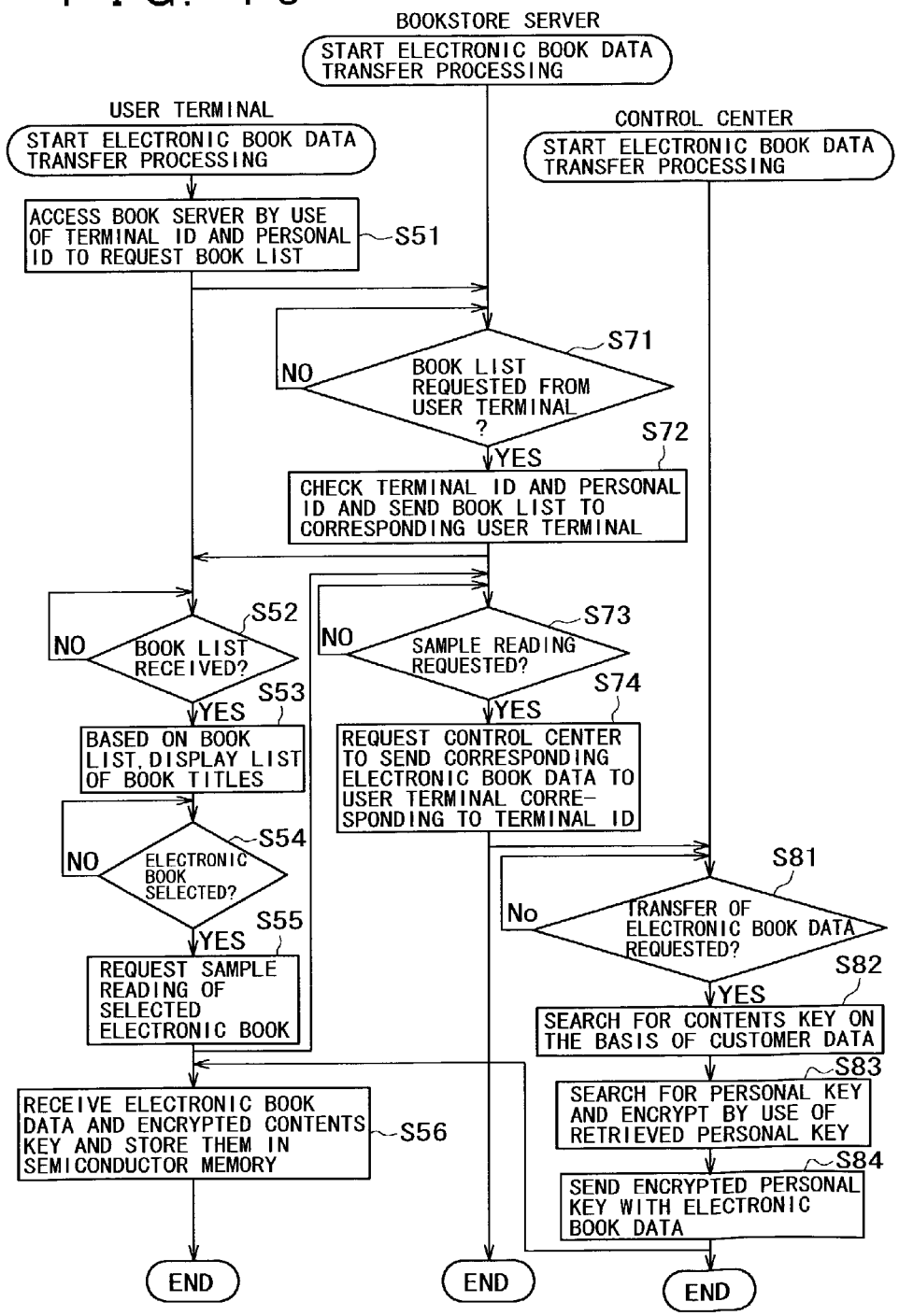
FIG. 10 is a flowchart describing electronic book data transfer processing.

The following describes, with reference to the flowchart shown in FIG. 10, processing of transferring a predetermined electronic book manufactured as described above for sample reading if the user wants to sample-read it before purchasing from the bookstore server 3 by use of the user terminal 6.

In step S51, the book purchase program 108*a* reads the terminal ID 108*f* from the storage section 108 and the personal ID 111*a* from the semiconductor memory 111 loaded on the drive 110 to access the bookstore server 3 by use of these IDs, thereby requesting the book list 48*e*.

In step S71, the book sale program 48*a* of the bookstore server 3 determines whether the book list 48*e* has been requested from the user terminal 6 and repeats this process until the request for the book list has come. If the book list 48*e* is found requested by the process of step S51, upon which the procedure goes to step S72.

In step S72, the book sale program 48*a* references, for authentication, the customer data 48*d* on the basis of the terminal ID and the personal ID received with the request for the book list 48*e* and sends the book list 48*e* to the user terminal 6 of the corresponding user.

In step S52, the book purchase program 108*a* determines whether the book list 48*e* has arrived. If the book list 48*e* is found received by the process of step S72, the procedure goes to step S53. In step S53, the book purchase program 108*a* displays the title information of electronic books on the display section 107 on the basis of the book list 48*e*.

Next, in step S54, the book purchase program 108*a* determines which of the electronic books displayed on the display section 107 has been selected and repeats this process until any one of the displayed electronic books is selected. For example, when the input section 106 is operated by the user and his desired electronic book is selected, the procedure goes to step S55. In step S55, the book purchase program 108*a* controls the communication section 109 to request the bookstore server 3 for the sample reading of the selected electronic book. To be more specific, the book purchase program 108*a* makes this request with the ID (for example, the ID for identifying such an electronic book as described on line 1 shown in FIG. 9) of the selected electronic book, the terminal ID 108*f*, and the personal ID 111*a*.

In step S73, the book sale program 48*a* of the bookstore server 3 determines whether the sample reading has been requested from the user terminal 6 and repeats this process until the sample reading is requested. If the request for sampling reading of the selected electronic book is found made by the process of step S55, the procedure goes to step S74.

In step S74, the book sale program 48*a* sends the ID for identifying the electronic book, the terminal ID and the personal ID to the control center 2 and instructs the control center 2 to transfer the electronic book data corresponding to the electronic book ID to the requesting user terminal 6 on the basis of the terminal ID 108*f*.

In step S81, the transfer program 28*m* of the control center 2 determines whether the transfer of the electronic book data has been requested from the bookstore server 3 and repeats this process until the request for the transfer is made. If the transfer of the electronic book data selected by the process of step S74 has been requested, the procedure goes to step S82.

In step S82, the transfer program 28*m* searches for the electronic book data 28*d* corresponding to the electronic book ID and then searches the contents key data 28*k* for the contents key corresponding to the electronic book data 28*d*.

In step S83, the transfer program 28*m* reads the personal key corresponding to the personal ID 111*a* from the personal key data 28*j* and encrypts the contents key by this personal key. In step S84, the transfer program 28*m* transfers the encrypted contents key to the user terminal 6 along with the electronic book data.

In step S56, the book purchase program 108*a* of the user terminal 6 receives the electronic book data and the encrypted contents key and controls the drive 110 to store the received data and key into the semiconductor memory 111.

By the above-mentioned processing, the user who operates the user terminal 6 references the book list handled by the bookstore managing the bookstore server 3 to obtain the desired electronic book data and the contents key encrypted by the personal key for sample reading. Therefore, in this state, the electronic book data have not been officially purchased.

Figure 11:
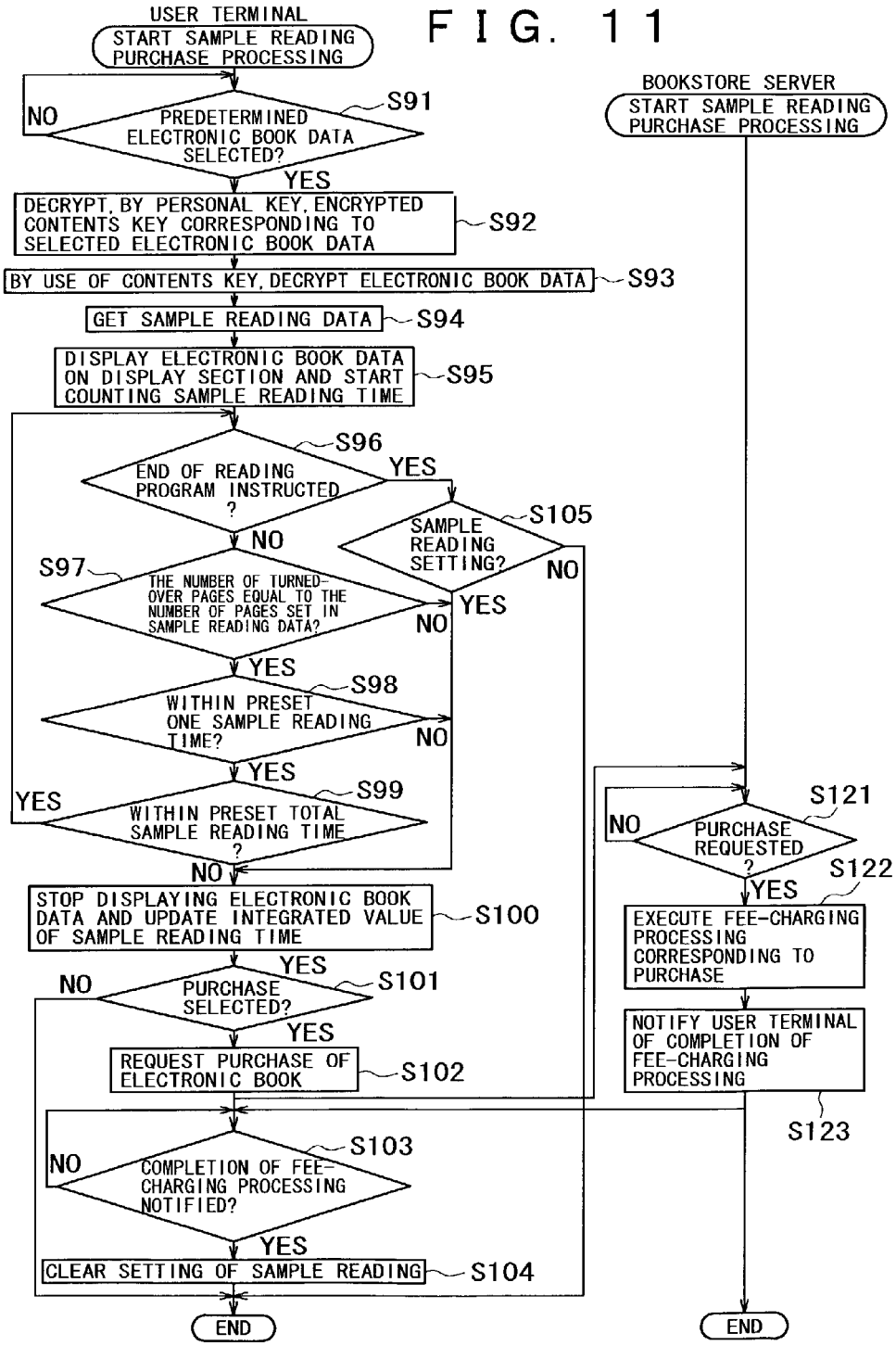
FIG. 11 is a flowchart describing electronic book sample reading purchase processing.

The following describes, with reference to the flowchart shown in FIG. 11, sample reading purchase processing which allows the user to sample-read an obtained electronic book at the user terminal 6 and purchase the electronic book from the bookstore server 3.

In step S91, the reading program 108*g* determines whether predetermined electronic book data have been selected and repeats this process until the predetermined electronic book data have been selected. If the electronic book data 111*b* are selected by the process described with reference to the flowchart of FIG. 10, the procedure goes to step S92.

In step S92, the reading program 108*g* controls the decryption program 108*d* to read the contents key corresponding to the selected electronic book data from the contents key data 111*f* and decrypts the contents key by use of the own personal key data 111*d*.

In step S93, the reading program 108*g* controls the decryption program 108*d* to decrypt the electronic book data by use of the decrypted contents key. In step S94, the sample reading monitor program 108*e* reads sample reading data from the decrypted electronic book data. To be more specific, if the electronic book data are described as shown in FIG. 9, the sample reading monitor program 108*e* reads the sample reading data described on lines 4 through 7.

Figure 12:
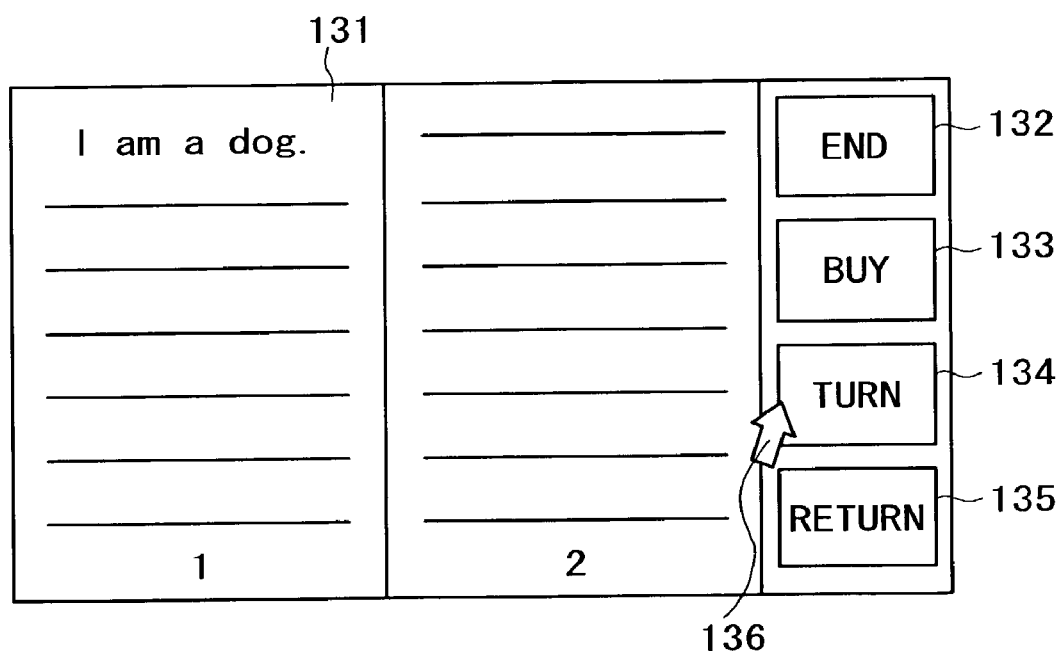
FIG. 12 is a diagram illustrating an exemplary display of an electronic book.

In step S95, as shown in FIG. 12, the reading program 108g displays the electronic book data on the display section 107 and, at the same time, the sample reading monitor program 108e starts counting the sample reading time. To be more specific, if the electronic book data are described as shown in FIG. 9, the reading program 108g displays the manuscript described on line 9 and on.

Figure 13:
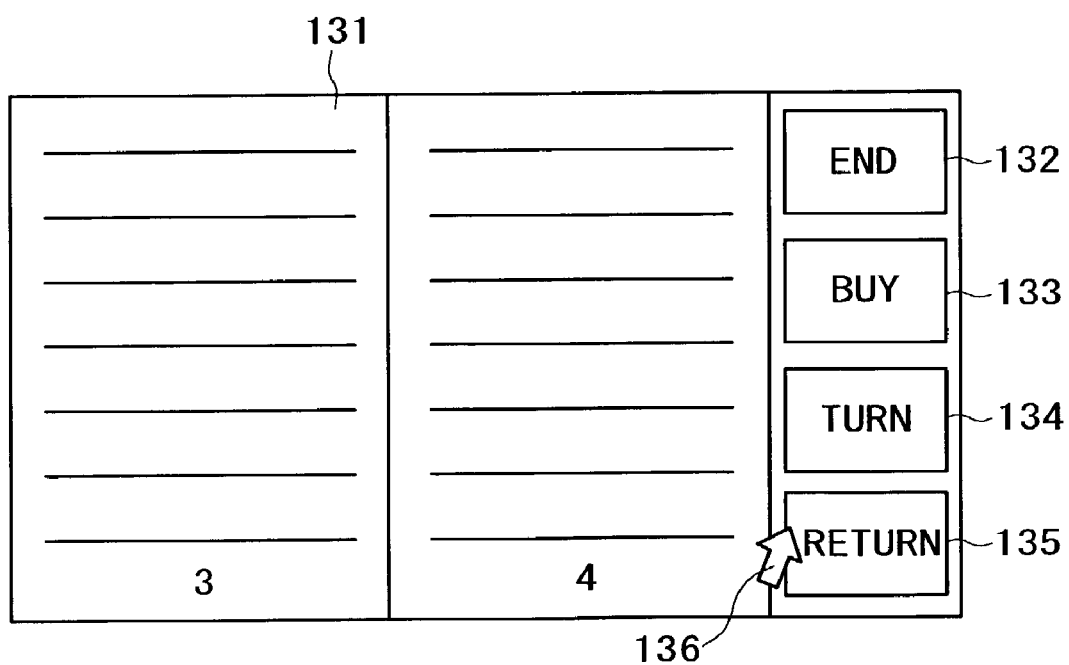
FIG. 13 is a diagram illustrating another exemplary display of an electronic book.

The following describes a screen to be displayed on the display section 107 by the reading program 108g. A manuscript display box 131 displays a manuscript which is equivalent to an actual book. In this example, "I am a dog. . . . " is displayed in the manuscript display box 131, which is the text displayed on lines 9 and on of the electronic book data shown in FIG. 9, the left side showing page 1 while the right side showing page 2. To the right side of the manuscript display box 131, various operator buttons are shown, such as an end button 132, a purchase button 133, a page turn button 134, and a return button 135 from top to bottom. When clicked with a pointer 136 which moves in response to the input section 106 operated by the user, the end button 131 ends the reading program 108g. The purchase button 133 is operated when purchasing an electronic book or a printed book. If the manuscript shown in the manuscript display box 131 is currently in the sample reading state, when the user operates the input section 106 and clicks the purchase button 133 for purchasing an electronic book, electronic book purchase processing starts. If the already purchased electronic book is shown in the manuscript display box 131 for example and the user operates the input section 106 and clicks the purchase button, printed book purchase processing starts. The page turn button 134 is operated to turn over pages of the displayed electronic book. As shown in FIG. 12 for example, when the pointer 136 is moved to the page turn button 134 and it is clicked, turned-over pages are shown, page 3 being shown in the left side of the manuscript display box 131 while page 4 is shown in the right side as shown in FIG. 13 in this example. The return button 135 at the bottom is operated to get back to a desired page. For example, when the pointer 136 is moved to the return button 135 and it is clicked, the pages are turned back as shown in FIG. 12. Thus, the manuscript display box 131 is displayed as if a printed book were opened and the page turning-over operation is performed as if the pages of a printed book were turned over.

Now, referring to FIG. 11 again, the description of sample reading purchase processing will be continued.

In step S96, when the input section 106 is operated by the user, the reading program 108g determines whether the end of the reading program 108g has been instructed. If the end of the reading program 108g has not been instructed, the procedure goes to step S97.

In step S97, the sample reading monitor program 108e determines whether the number of turned-over pages is within the number of pages set in the sample reading data. If the number of turned-over pages is found within the number of pages set in the sample reading data, then the procedure goes to step S98.

In step S98, the sample reading monitor program 108e determines whether the time permitted for one session of sample reading is within the permitted sample reading period of time. If the time is found within the permitted sample reading period of time, the procedure goes to step S99. In step S99, the sample reading monitor program 108e determines whether the time is within the preset total sample reading time. If the time is found not in the permitted total sample reading time, the procedure goes to step S100.

In step S100, the reading program 108g stops displaying the electronic book data and, at the same time, the sample reading monitor program 108e computes the accumulated time of the sample reading time to update the sample reading data 111c.

In step S101, the book purchase program 108a determines whether the purchase has been selected. If the purchase button 133 shown in FIG. 12 has been clicked, it is determined that the purchase has been selected, upon which the procedure goes to step S102.

In step S102, the book purchase program 108a accesses the bookstore server 3 to request the purchase of the electronic book. To be more specific, on the basis of the URL indicative of a bookstore (for example, the URL described on line 7 shown in FIG. 9) recorded in the sample reading data 111c, the book purchase program 108a accesses the bookstore server 3 to request the purchase of the book with the personal ID 111a and the ID of the book to be purchased.

In step S121, the book sale program 48a of the bookstore server 3 determines whether the purchase has been requested and repeats this process until the purchase is requested. If the purchase is found requested by the process of step S102, then the procedure goes to step S122.

In step S122, the book sale program 48a controls the fee-charging program 48c to cause the finance server 7 to execute the fee-charging processing on the purchase. To be more specific, the book sale program 48a references the customer data 48d from the personal ID 111a received by the process of step S102 and sends the price information of the book to the fee-charging program 48c on the basis of the account number of the user requesting the purchase and the ID of the book to be purchased, thereby causing the fee-charging program 48c to cause the finance server 7 to execute the fee-charging processing.

In step S123, the book sale program 48a controls the communication section 49 to send, upon completion of the processing of the fee-charging program 48c, the completion notice about the fee-charging processing to the user terminal 6.

In step S103, the book purchase program 108a determines whether the completion of the fee-charging processing has been notified and repeats this process until the completion of the purchase is notified. If the completion of the fee-charging processing has been notified by the process of step S123, then the procedure goes to step S104.

In step S104, the book purchase program 108a clears the sample reading setting recorded to the sample reading data 111c. To be more specific, in the case of the sample reading data 111c shown in FIG. 9 for example, the book purchase program 108a turns off the sample reading setting described line 8. To be still more specific, a clear key for clearing the sample reading setting is sent by the book sale program 48a in step S123 and the book purchase program 108a clears the sample reading setting by use of this clear key.

In step S96, if the end button shown in FIG. 12 is clicked for example, the procedure goes to step S105. In step S105, the sample reading monitor program 108e determines whether the sample reading setting is turned on. If "ON" is described as the sample reading on line 8 in the case of the sample reading data shown in FIG. 9 for example, it is determined that the sample reading setting is on, upon which the procedure goes to step S100 by skipping the processes of steps S97 through S99. If the sample reading setting is turned off by the process of step S104, the processing comes to an end.

In step S97, if the number of turned-over pages is not within the predetermined number of pages, then the procedure goes to step S100. To be more specific, in the case of the sample reading data shown in FIG. 9, "200 page" is described on line 4, so that if more than 200 pages are turned-over, the value does not fall within 200, namely the sample reading monitor program 108e determines that the number of turned-over pages is over the predetermined value, upon which the procedure goes to step S100.

In step S98, if the time is fount not within the predetermined time of one session of sample reading, then the processing goes to step S100. To be more specific, in the case of the sample reading data shown in FIG. 9 for example, "15 min" is described on line 5 as the sample reading time for one session, so that the sample reading time for one session has exceeded 15 minutes, namely the sample reading monitor program 108e determined that the sample reading period is not within the predetermined time for one session of sample reading, upon which the procedure goes to step S100.

If the time is found within the predetermined total sample reading time in step S99, then the procedure returns to step S96. To be more specific, in the case of the sample reading data shown in FIG. 9 for example, the total sample reading time is set to "45 min" on line 6, so that, if the sample reading monitor program 108e determines that the total sample reading time is not over 45 minutes, namely within 45 minutes, the procedure returns to step S96.

Thus, as long as the predetermined conditions set as the sample reading data are satisfied, the sample reading monitor program 108e repeats the processes of steps S96 through S99 while the reading program 108g is active and, if any of the conditions, the number of turned-over pages, the sample reading time for one session, and the total sample reading time, is not satisfied, the display of the manuscript is stopped and cannot be displayed again unless the sample reading setting is cleared by the process of step S104.

As a result, each electronic book to be read by the user on a preview basis can be sample-read as long as it is loaded in the user terminal 6 and satisfies the predetermined sample reading conditions. However, because such an electronic book can be sample-read only within the predetermined conditions set in the sample reading data, if the electronic book is not purchased, the electronic book cannot be read, thereby preventing the copyright held by the publishing company or the author from being violated while permitting the user to sample-read the electronic book without condition. When the electronic book is purchased, the sample reading setting is only cleared, so that the processing of transferring the electronic book again is not necessary, thereby saving the time and labor for purchasing the electronic book. If the number of turned-over pages of an electronic book is set to infinity and sample reading is monitored only by the sample reading time for example, the user can browse all pages of the electronic book within the predetermined period of one session of sample reading or the total sample reading time set in the sample reading data, thereby allowing the user to fully examine the contents of the electronic book to be purchased. In the above-mentioned examples, the description is made by use of the case in which each electronic book is purchased in its entirety. It will be apparent that each electronic book can also be sample-read or purchased on a chapter basis, "only Chapter 5" for example.

Figure 14:
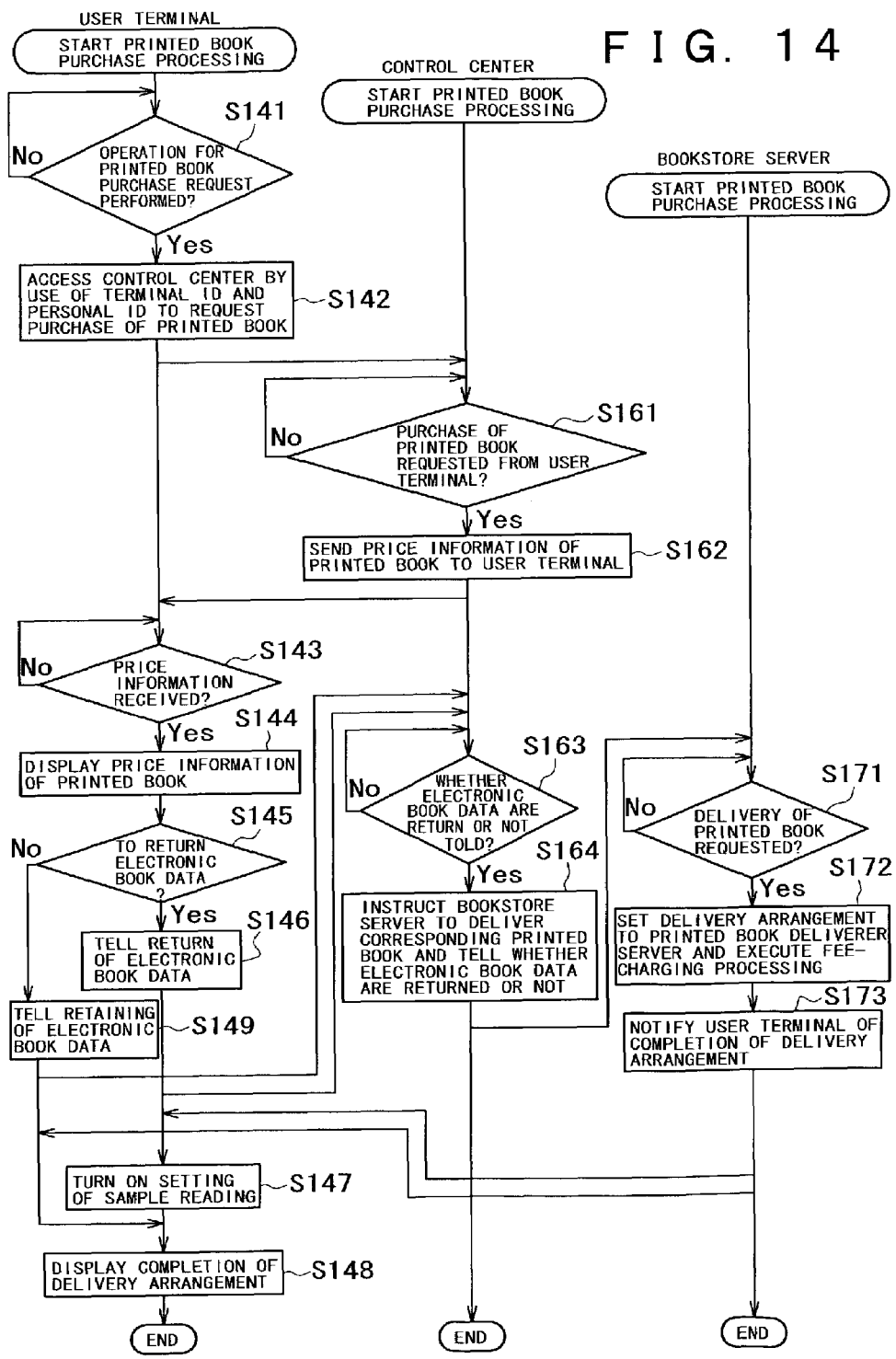
FIG. 14 is a flowchart describing printed book purchase processing.

The following describes, with reference to the flowchart shown in FIG. 14, the processing of purchasing a printed book after the purchasing of its electronic equivalent performed by the above-mentioned processing.

In step S141, the book purchase program 108a determines whether an operation for requesting the purchase of the printed book has been performed and repeats this process until such an operation is performed. If, after purchasing an electronic book, the purchase button 133 shown in FIG. 12 is clicked, it is determined that the purchase of the printed equivalent has been requested, upon which the procedure goes to step S142.

In step S142, the book purchase program 108a controls the communication section 109 sends a printed book purchase request to the control center 2 on the basis of the address (for example, the URL described on line 7 shown in FIG. 9) of the bookstore server 3 from which the purchase is made described in the sample reading data 111c, along with the terminal ID 108f, the personal ID 111a, and the ID for identifying the specified book.

In step S161, the transfer program 28m determines whether the purchase of the printed book has been requested from the user terminal 6 and repeats this process until the purchase is requested. If the purchase of the printed book has been requested by the process shown in step S142, it is determined that the purchase has been requested, upon which the procedure goes to step S162.

In step S162, the transfer program 28m controls the communication section 29 to receive the terminal ID 108f and the personal ID 111a, the ID for identifying the specified book, and the address, of the bookstore server 3 from which the purchase is made, described in the sample reading data 111c, from the user terminal 6, searches the book list 28i on the basis of the received ID for book identification, and sends the price information of the printed book to the user terminal 6.

In step S143, the book purchase program 108a determines whether the price information of the printed book to be purchased has been sent from the control center 2. When this price information of the printed book to be purchased is found received from the control center 2 by the process of step S162, then the procedure goes to step S144.

In step S144, the book purchase program 108a displays two kinds of price information; one being charged when the electronic book data are returned while the other being charged when the electronic book data are retained. It should be noted that the number of kinds of pricing may be more than two. Namely, in this price information display, a screen is displayed for selecting the returning or retaining of the electronic book data. For example, the displaying of this screen allows to provide services, when the electronic book data are returned, of discounting the payment for the purchase of an electronic book to display the purchase price of the printed equivalent.

In step S145, the book purchase program 108a determines whether the returning of the electronic book data has been selected. If the returning has been selected, then, in step S146, the book purchase program 108a notifies the control center 2 of the returning of the electronic book data.

In step S163, the transfer program 28m determines whether the returning of the electronic book data has been notified. If the returning of the electronic book data has been found notified by the process of step S146, the transfer program 28m requests the bookstore server 3 to deliver the printed book corresponding to the ID for identifying the book on the basis of the address of the bookstore server 3 from which the purchase is made described in the sample reading data 111c. At this moment, the transfer program 28m also notifies whether the electronic book data are returned or not.

In step S171, the printed book order placing program 48f of the bookstore server 3 determines whether the delivery of the printed book has been requested and repeats this process until the delivery is requested. If the delivery of the printed book is found requested by the process of step S164, the procedure goes to step S172. In step S172, the printed book order placing program 48f controls the communication section 49 to request the printed book deliverer server 8 for the delivery of the printed book and causes the fee-charging program to perform corresponding fee-charging processing. To be more specific, on the basis of the terminal ID and personal ID received from the user terminal 6 in the process of step S162, the printed book order placing program 48f searches the customer data 48d for the address of the user from the personal information included in the customer data and, on the basis of the ID for identifying the book, identifies, from the book list 48e, the printed book to be delivered, thereby sending these pieces of information to the printed book deliverer server 8 to request the delivery. At the same time, the printed book order placing program 48f obtains the price of the printed book based on whether or not to return the electronic book data and controls the fee-charging program 48c to cause the finance server 7 to execute the corresponding fee-charging processing.

In step S173, the printed book order placing program 48f controls the communication section 49 to notify the user terminal 6 of the completion of the arrangements of delivery.

In step S147, the book purchase program 108a turns on the sample reading setting of the sample reading data and, in step S148, displays the completion of the arrangements of delivery on the display section 107.

In step S145, if the electronic book data are found to be retained, then the book purchase program 108a notifies the control center 2 of the retaining of the electronic book data in step S149 and the procedure goes to step S148 by skipping the process of step S147.

Namely, if the sample reading conditions are satisfied by turning on the sample reading setting of the sample reading data by the process of step S147, the further browsing of the sample reading data is disabled, so that, actually, the electronic book data are put in the state in which they have been returned.

In the above description, the electronic book data are returned by turning on the sample reading setting of the electronic book data. Alternatively, the electronic book data may be put in the state in which the electronic book data cannot be used at the user terminal 6 at which the printed equivalent has been purchased; actually, for example, the electronic book data may be sent to the bookstore server 3 from which the purchase was made or the electronic book data may be deleted from the user terminal 6.

If there are two or more bookstore servers 3 from which printed books can be purchased, the stock of a desired printed book may be checked at any of the bookstore servers 3 and if, there is no stock at the checked bookstore server 3, then an other bookstore server 3 having the stock may be requested to deliver the requested printed book, on the delivery of the printed book by a printed book deliverer server 8 which is managed by a printed book deliverer nearest to an address for delivery can be requested. In this case, the user need not check or search for the stock on his own, which allows the user to smoothly request the delivery of printed books. In addition, because the requested printed book is delivered from the nearest printed book deliverer, the delivery cost can be reduced.

Consequently, after purchasing electronic book data, the user can place an order for the printed equivalent to a printed book deliverer by following a simple procedure without searching for a bookstore having the stock or newly performing an order application procedure (on the basis of the order information received at the printed book deliverer server 8, the printed book deliverer delivers the requested printed book to the requesting user).

Figure 15:
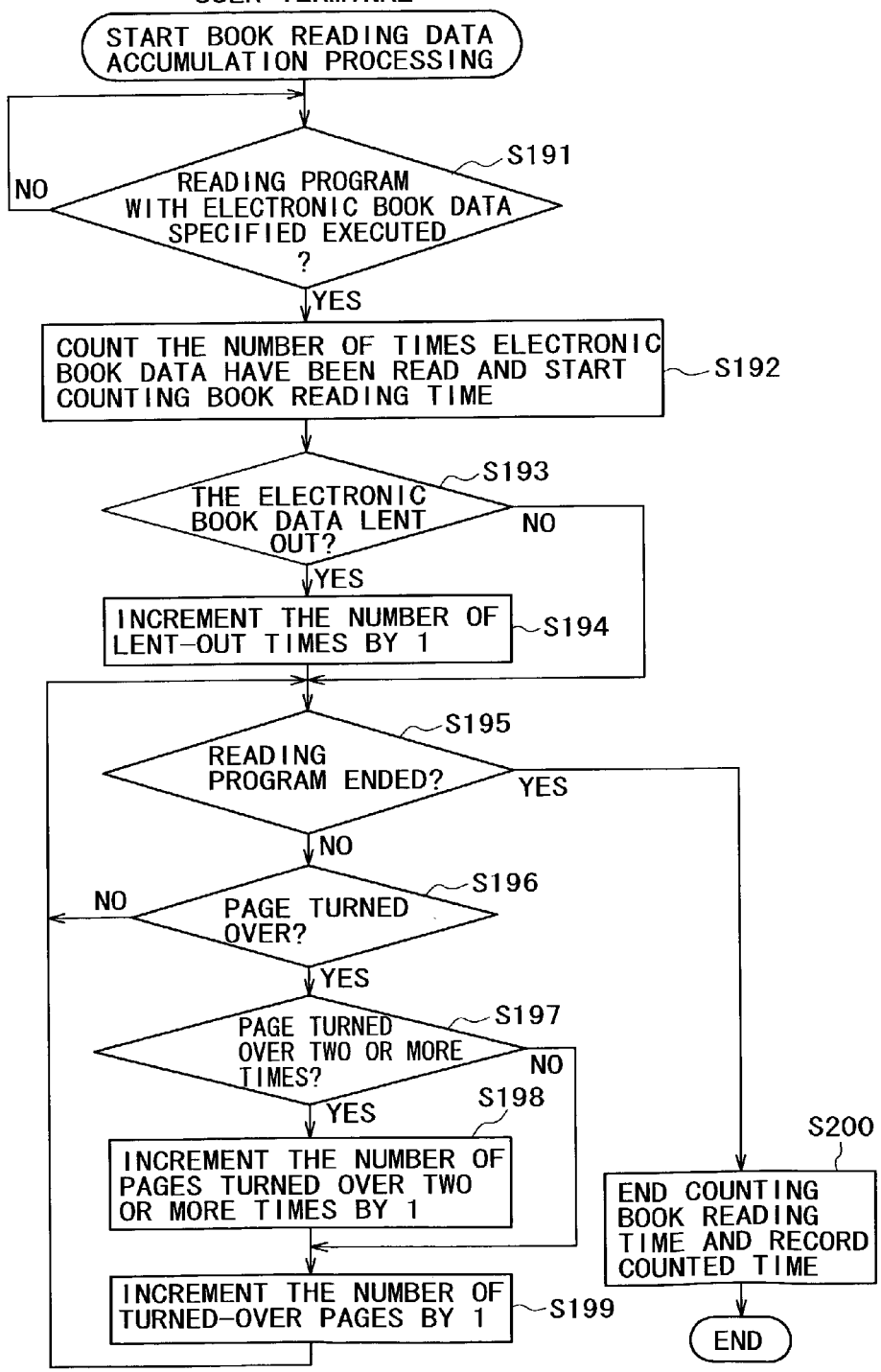
FIG. 15 is a flowchart describing book reading data accumulation processing.
Figure 16:
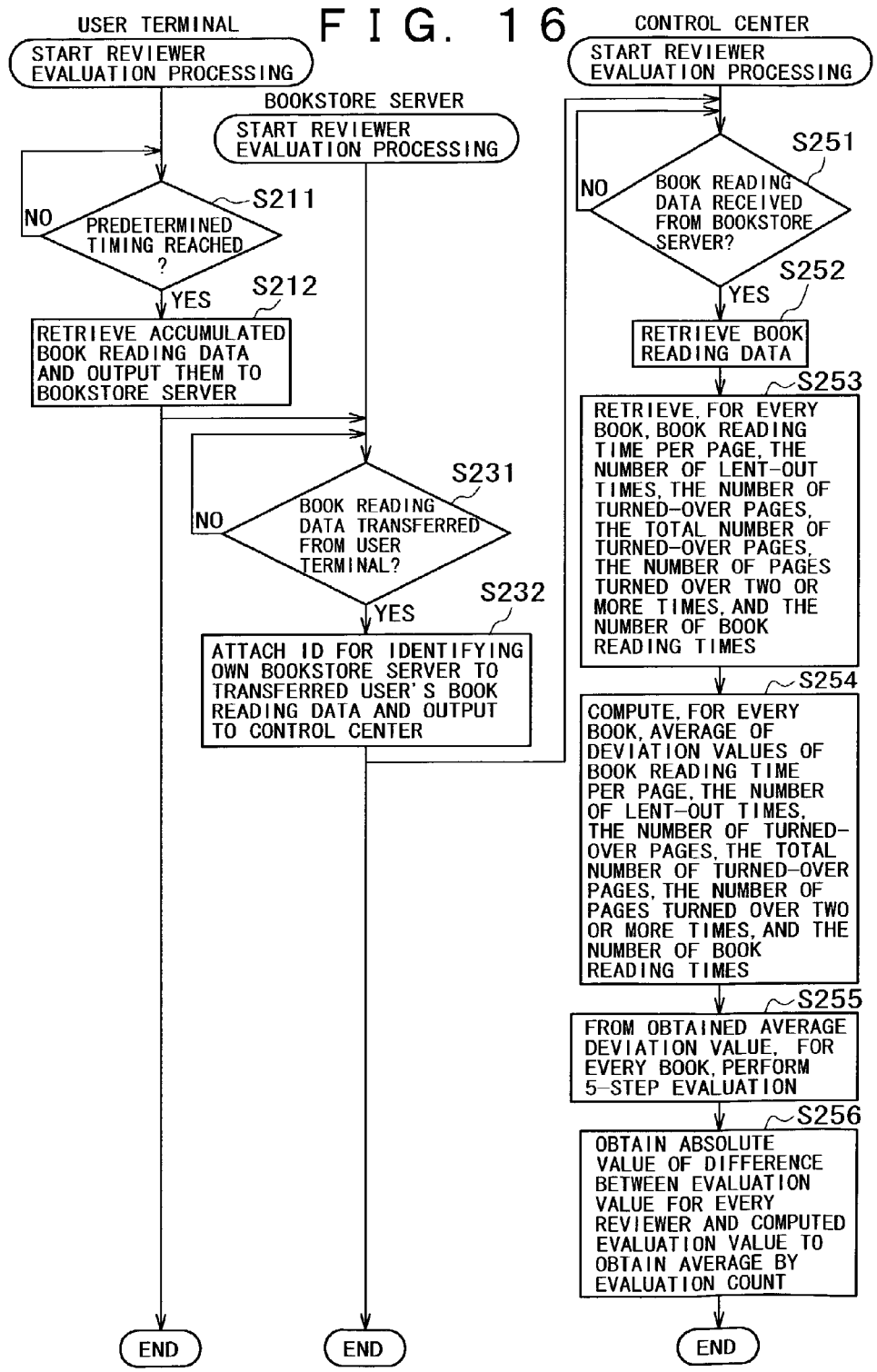
FIG. 16 is a flowchart describing reviewer evaluation processing.

The following describes, with reference to the flowcharts shown in FIGS. 15 and 16, the processing of evaluating book reviewers. This processing compares the evaluation of books by reviewers with the evaluation by the readers (users) of the books to determine how close the reviewer's evaluation is to the reader's evaluation. It is assumed that the closer the evaluations, the more correct the reviewer's evaluation. So, first, with reference to the flowchart shown in FIG. 15, the processing of accumulating user's reading data for browsing (or reading) electronic book data will be described by use of the user terminal 6.

In step S191, the book reading data management program 108c determines whether electronic book data have been specified to execute the reading program and repeats this process until electronic book data have been specified to execute the reading program. When the input section 106 is operated by the user and electronic book data are specified to execute the reading program, the procedure goes to step S192.

In step S192, the book reading data management program 108c counts the number of times specified book has been read (increments the number of times book reading data 111e have been read by 1), thereby starting counting the reading duration of time. In step S193, the book reading data management program 108c determines whether the specified electronic book data are lent out. To be more specific, the book reading data management program 108c checks the personal ID 111a to determine whether it was registered beforehand. Namely, the purchase of electronic book data is performed by use of both the personal ID 111a and the terminal ID 108f, so that if the personal ID recorded in the semiconductor memory 111 is not the same as the registered personal ID 111a, these electronic book data are determined that they were purchased from another user terminal 6 and the electronic book data recorded in the semiconductor memory 111 are assumed that they were lent out. If the electronic book data are found lent out in step S193, the lent-out count is incremented by 1 in step S194 and the procedure goes to step S195. If the electronic book data are found not lent out in step S193, then the procedure goes to step S195 by skipping the process of step S194.

In step S195, the book reading data management program 108c determines whether the reading program 108g has ended. If the reading program 108g is found not ended, then the procedure goes to step S196.

In step S196, the book reading data management program 108c determines whether the page turn button 134 has been clicked to turn over pages and repeats this process until pages are turned over by returning to step S195. Namely, until pages are turned over, the processes of steps S195 and S196 are repeated.

If the page turn button 134 is found clicked to turn over pages in step S196, then the book reading data management program 108c determines in step S197 whether a certain page has been turned over two or more times. If the page is found turned over two or more times, then the book reading data management program 108c increments the number of pages turned over two or more times by 1 in step S198 and the procedure goes to step S199. If the page is found not turned over two or more times in step S197, then the procedure goes to step S199 by skipping the process of step S198.

In step S199, the book reading data management program 108c increments the number of turned-over pages in the book reading data 111e by 1 and the procedure returns to step S195. In step S195, if the end button 132 is found clicked to end the reading program 108g, then the procedure goes to step S200.

In step S200, the book reading data management program 108c ends counting the reading time and records the counted time to the book reading data 111e, ending this process.

Namely, the book reading data management program 108c repeats the processes of steps 195 through 199 until the reading program 108g ends, repeating the counting of the number of turned-over pages and the number of pages turned over two or more times. When the reading program 108g ends, the book reading data management program 108c records the counted time, thereby ending the process. Thus, the book reading data management program 108c generates the book reading data 111e.

The following describes, with reference to the flowchart shown in FIG. 16, the processing of gathering the book reading data 111e created by the above-mentioned processing from two or more user terminals 6, obtaining the reviews by readers about the a book, comparing the readers' evaluation with reviewers' evaluation, and evaluating reviewers.

In step S211, the book reading data management program 108c of the user terminal 6 determines whether a predetermined timing has reached and repeats this process until the predetermined timing is reached. The predetermined timing herein denotes the timing for accessing the bookstore server 3, such as accessing the bookstore server 3 when requesting the transfer of electronic book data described with reference to the flowchart shown in FIG. 10. The book reading data 111e are gathered by the bookstore server 3. It should be noted that this timing may also be the timing only for sending the book reading data 111e to the bookstore server 3; for example, the timing for the user terminal 6 to access the bookstore server 3 at its own initiative at predetermined time intervals (for example, once a month).

In step S212, the book reading data management program 108c controls the communication section 109 to send the book reading data 111e to the bookstore server 3.

In step S231, the book sale program 48a determines whether the book reading data 111e have been transferred from the user terminal 6 and repeats this process until the book reading data 111e are transferred from the user terminal 6. In step S231, if the book reading data 111e are found transferred from the user terminal 6 by the process of step S212, the processing goes to step S232.

In step S232, the book sale program 48a controls the communication section 49 to attach the ID for identifying the bookstore server 3 to the transferred user's book reading data 111e and transfer the resultant data to the control center 2.

In step S251, the book evaluation program 28h determines whether the book reading data 111e have been received from the bookstore server 3 and repeats this process until the data are received. If the book reading data 111e are found received from the bookstore server by the process of step S232, then the book evaluation program 28h controls the communication section 29 to receive the book reading data Tile in step S252.

In step S253, the book evaluation program 28h retrieve, for every book, the book reading time per page, the number of lent-out times, the number of turned-over pages and the total number of turned-over pages, the number of pages turned over two or more times, and the number of times reading has been made from the book reading data 111e.

In step S254, the book evaluation program 28h obtains, for every book, the deviation values about the book reading time per page, the number of lent-out times, the number of turned-over pages and the total number of turned-over pages, the number of pages turned over two or more times, and the number of times reading has been made and then obtains the average of these deviation values.

In step S255, the book evaluation program 28h obtains a 5-step evaluation value for each book on the basis of the obtained average deviation value. To be more specific, as shown in FIG. 17, on the basis of the deviation value, the book evaluation program 28h obtains the 5-step evaluation of that book. Namely, if the deviation value is less than 35, the reader's evaluation of that book is 1; if the deviation value is 35 or more and less than 45, its reader's evaluation is 2; if the deviation value is 45 or more and less than 55, its reader's evaluation is 3; if the deviation value is 55 or more than less than 65, its reader's evaluation value is 4; and if the deviation value is 65 or more, its reader's evaluation is 5.

In step S256, the book evaluation program 28h obtains, for each book, the absolute value of the difference between the evaluation value of each reviewer and the reader's evaluation value and obtains the average of the absolute value by number of evaluation to obtain the evaluation capability value of each reviewer, recording the results to the review data 28l (if the evaluation capability value has already been recorded, they are updated by the new value).

To be more specific, it is assumed that there be reviewers O through R, who reviewed books A through C and evaluated them as shown in FIG. 18. Namely, reviewer O evaluated book A as 5, book B as 3, and book C as 4; reviewer P evaluated book A as 4, book B as 2, and book C as 5; reviewer Q evaluated book A as 4, book B as 1, and book C as 3; and reviewer R evaluated book A as 2, book B as 1, and book C as "–" (not evaluated). The reader's evaluation values are 4 for book A, 2 for book B, and 4 for book C. It should be noted that the higher the evaluation value, the higher the evaluation for that book. At this time, for reviewer O, the absolute value of the difference between his evaluation and reader's evaluation is 1 for book A, 1 for book B, and 0 for book C, so that the average of the absolute values of the differences which are the reviewer's evaluation capability value is 0.67 (=(1+1+0)/3). Likewise, for reviewer P, the absolute value of the difference between his evaluation and reader's evaluation is 0 for book A, 0 for book B, and 1 for book C, so that the average of the absolute values of the differences which are the reviewer's evaluation capability value is 0.33 (=(0+0+1)/3). For reviewer Q, the absolute value of the difference between his evaluation and reader's evaluation is 0 for book A, 1 for book B, and 1 for book C, so that the average of the absolute values of the differences which are the reviewer's evaluation capability value is 0.67 (=(0+1+1)/3). For reviewer R, the absolute value of the difference between his evaluation and reader's evaluation is 2 for book A, 1 for book B, and none for book C, which therefore is omitted from the evaluation count, so that the average of the absolute values of the differences which are the reviewer's evaluation capability value is 1.5 (=(2+1)/2). These computations indicate that, as the evaluation value of each reviewer closer to the evaluation value of the reader, the evaluation capability of each reviewer goes high (the closer to the reader's evaluation value, it indicates that the reviewer makes evaluations which are accepted by the reader more easily) Therefore, the ranking of the evaluation capabilities of reviewers O through R can be objectively shown; the top position is for reviewer P, the second position for reviewers O and Q, and the third position for reviewer R.

Consequently, the comparison between the evaluation by book reviewers with the reader's evaluation allows the evaluation of reviewers with an objective standard, so that each reader can easily find out reviewers having high evaluation capabilities and, by referencing the reviews by the reviewers having high evaluation capabilities, find out books of objectively high evaluations. This also allows publishing industries to objectively evaluate book presenters by the above-mentioned objective standard, thereby finding out excellent book presenters. In addition, by compiling bookstore IDs, the sales of each bookstore can be obtained.

In the above-mentioned processing, because the book reading data 111e are associated with the personal privacy of each reader, it is desirable, when transferring the book reading data 111e from the user terminal 6 to the bookstore server 3, to transfer the book reading data 111e with permission by the user or prompt the user to confirm the transfer.

The above-mentioned sequence of processing operations may also be executed not only by hardware but also by software. This software is installed in a computer in which the programs constituting this software are installed in a dedicated hardware component or a general-purpose personal computer which can execute various functions by installing corresponding programs from a recording medium.

This recording medium is provided to the user as installed in the control center 2 as shown in FIG. 2, in the bookstore server 3 as shown in FIG. 4, in the author terminal 4 as shown in FIG. 5, in the publisher server 5 as shown in FIG. 6, and the user terminal 6 as shown in FIG. 7. This recording medium is constituted not only by the storage sections 28, 48, 68, 88 and 108 storing programs, but also by a package medium which is distributed to the user to provide programs separately from computers, which is based on the magnetic discs 211, 231, 251, 271 and 291 (including flexible disc), the optical discs 212, 232, 252, 272 and 292 (including CD-ROM (Compact Disc-Read Only Memory) and DVD (Digital Versatile Disc), magneto-optical discs 213, 233, 253, 273 and 293 (including MD (MiniDisc) (trademark), or semiconductor memories 214, 234, 254, 274 and 294 (including Memory Stick for example).

It should be noted that, in the present specification, the steps for describing the program to be recorded in a recording medium include not only the processing operations to be executed sequentially in time-series manner but also the processing operations to be executed in parallel or discretely.

It should be noted that term "system" as used herein denotes entire equipment composed of a plurality of apparatuses.

As described and according to the invention, there are provided an information processing apparatus and method and program in which electronic book data attached with information of an address on a network of a first other information processing apparatus which receives a request for the delivery of a printed book corresponding to an electronic book are stored along with a user ID for identifying each user, the electronic book is displayed, the request for delivering the printed book corresponding to the electronic book is instructed, the request for the delivery of the printed book and the user ID are sent to the first other information processing apparatus corresponding to that address, upon instruction for the request for the delivery of the printed book corresponding to the electronic book, and a notice of the reception of the request for delivery is received from a second other information processing apparatus.

As described and according to the invention, there are provided another information processing apparatus and method and program in which a request for delivering a printed book corresponding to an electronic book received from a first other information processing apparatus is received along with a user ID for identifying each user, the personal information including the address information of the user corresponding to the user ID is stored, a plurality of second other information processing apparatuses are checked for the stock of the printed book, and, on the basis of the check results and the address information of the user, any one of the second other information processing apparatuses is selected, and the request for delivering the printed book and the user address information are transferred to the selected second other information processing apparatus.

As described and according to the invention, there are provided further another information processing apparatus and method and program in which the delivery of a printed book corresponding to an electronic book received from a first other information processing apparatus is requested, the address of a requesting user is received, the received request for the delivery of the printed book corresponding to the electronic book and the received address of the user are stored, and, on the basis of the stored request and the user address, a notice indicative of the reception of the request for the delivery of the printed book is sent to a second other information processing apparatus.

As described and according to the invention, there are provided an information processing system and method and program in which: a first information processing apparatus stores electronic book data attached with information of an address on a network of a second information processing apparatus which receives a request for the delivery of a printed book corresponding to an electronic book and a user ID for identifying a user, displays the electronic book, instructs the request for the delivery of the printed book corresponding to the electronic book, and, upon instruction of the request for the delivery of the printed book corresponding to the electronic book, sends the request for the delivery of the printed book and the user ID to the second information processing apparatus corresponding to the above-mentioned address, receives a notice indicative of the reception of a delivery request from a third information processing apparatus; the second information processing apparatus receives the request for the delivery of the printed book corresponding to the electronic book and the user ID for identifying the user from the first information processing apparatus, stores personal information including address information of the user corresponding to the user ID, checks a plurality of third information processing apparatuses for the stock of the printed book, selects any one of the third information processing apparatuses on the basis of the results of the checking and the address of the user corresponding to the user ID, transfers the request for the delivery of the printed book and the address information of the user to the selected third information processing apparatus; and the third information processing apparatus receives the request for the delivery of the printed book corresponding to the electronic book and the address information of the user from the second information processing apparatus, stores the received request for the delivery of the printed book corresponding to the electronic book and the address information of the user, and sends a notice indicative of the reception of the request for the delivery of the printed book to the first information processing apparatus on the basis of the stored request for the delivery of the printed book and the stored address information of the user.

Consequently, the novel constitution allows the user to place an order for printed books to a printed book deliverer by following a simple procedure without searching for bookstores having the stock of desired printed book or following a new application procedure.

While the preferred embodiments of the present invention have been described using specific terms, such description is for illustrative purposes only, and it is to be understood that changes and variations may be made without departing from the spirit or scope of the appended claims.

FIG. 1
8-1 PRINTED BOOK DELIVERER SERVER
8-2 PRINTED BOOK DELIVERER SERVER
8-3 PRINTED BOOK DELIVERER SERVER
2 CONTROL CENTER
3-1 BOOKSTORE SERVER
3-2 BOOKSTORE SERVER
3-3 BOOKSTORE SERVER
1 NETWORK
4 AUTHOR TERMINAL
5 PUBLISHER TERMINAL
6 USER TERMINAL
7 FINANCE SERVER

FIG. 2
21 CPU
22 ROM
23 RAM
25 INPUT/OUTPUT INTERFACE
26 INPUT SECTION
27 DISPLAY SECTION
28 STORAGE SECTION
28m TRANSFER PROGRAM
28l REVIEW DATA
28k CONTENTS KEY DATA
28j PERSONAL KEY DATA
28i BOOK LIST
28h BOOK EVALUATION PROGRAM
28a ELECTRONIC BOOK MANUFACTURING PROGRAM
28b CONTENTS KEY GENERATING PROGRAM
28c FEE-CHARGING PROGRAM
28d ELECTRONC BOOK DATA
28e SAMPLE READING DATA
28f BOOKSTORE DATA
28g CUSTOMER DATA
29 COMMUNICATION SECTION
201 DRIVE
211 MAGNETIC DISC
212 OPTICAL DISC
213 MAGNETO-OPTICAL DISC
214 SEMICONDUCTOR MEMORY

Control Center 2

FIG. 3
CUSTOMER DATA
　PERSONAL ID
　CUSTOMER ATTRIBUTE DATA
　USE RESULT DATA
　TERMINAL ID
　PERSONAL KEY
　PERSONAL INFORMATION

FIG. 4
41 CPU
42 ROM
43 RAM
45 INPUT/OUTPUT INTERFACE
46 INPUT SECTION
47 DISPLAY SECTION
48 STORAGE SECTION
48a BOOK SALE PROGRAM
48b PERIODICAL SUBSCRIPTION DELIVERY PROGRAM
48c FEE-CHARGING PROGRAM
48d CUSTOMER DATA
48e BOOK LIST
48f PRINTED BOOK ORDER PLACING PROGRAM
49 COMMUNICATION SECTION
221 DRIVE
231 MAGNETIC DISC
232 OPTICAL DISC
233 MAGNETO-OPTICAL DISC
234 SEMICONDUCTOR MEMORY

Bookstore Server 3

FIG. 5
61 CPU
62 ROM
63 RAM
65 INPUT/OUTPUT INTERFACE
66 INPUT SECTION
67 DISPLAY SECTION
68 STORAGE SECTION
68a MANUSCRIPT DATA
68b DOCUMENT EDITING PROGRAM
68c MANUSCRIPT SENDING PROGRAM
68d TERMINAL ID
68e FEE-CHARGING PROGRAM
69 COMMUNICATION SECTION
241 DRIVE
251 MAGNETIC DISC
252 OPTICAL DISC
253 MAGNETO-OPTICAL DISC
254 SEMICONDUCTOR MEMORY

Author Terminal 4

FIG. 6
81 CPU
82 ROM
83 RAM
85 INPUT/OUTPUT INTERFACE
86 INPUT SECTION
87 DISPLAY SECTION
88 STORAGE SECTION
88a BOOK LIST
88b FEE-CHARGING PROGRAM
88c MANAGEMENT PROGRAM
89 COMMUNICATION SECTION
261 DRIVE
271 MAGNETIC DISC
272 OPTICAL DISC
273 MAGNETO-OPTICAL DISC
274 SEMICONDUCTOR MEMORY

Publisher Server 5

FIG. 7
101 CPU
102 ROM
103 RAM

105 INPUT/OUTPUT INTERFACE
106 INPUT SECTION
107 DISPLAY SECTION
108 STORAGE SECTION
108a BOOK PURCHASE PROGRAM
108b PERIODICAL SUBSCRIPTION PROGRAM
108c BOOK READING MANAGEMENT PROGRAM
108d DECRYPTION PROGRAM
108e SAMPLE READING MONITOR PROGRAM
108f TERMINAL ID
108g READING PROGRAM
109 COMMUNICATION SECTION
111 DRIVE
111a PERSONAL ID
111b ELECTRONIC BOOK DATA
111c SAMPLE READING DATA
111d PERSONAL KEY DATA
111e BOOK READING DATA
111f CONTENTS KEY DATA
111 SEMICONDUCTOR MEMORY
281 DRIVE
291 MAGNETIC DISC
292 OPTICAL DISC
293 MAGNETO-OPTICAL DISC
294 SEMICONDUCTOR MEMORY

User Terminal 6

FIG. 8
  Author Terminal
  START ELECTRONIC BOOK MANUFACTURING PROCESSING
S1 ACCESS PUBLISHER SERVER TO APPLY FOR TRANSMISSION OF MANUSCRIPT.
S2 MANUSCRIPT TRANSFER INSTRUCTED?
S3 SENDING MANUSCRIPT DATA TO CONTROL CENTER.
S4 RECEIVE NOTIFICATION OF REGISTRATION COMPLETION AND FEE-CHARGING RESULT.
  END
  Publisher Server
  START ELECTRONIC BOOK MANUFACTURING PROCESSING
S21 MANUSCRIPT TRANSMISSION APPLIED?
S22 IDENTIFY AUTHOR BY ID AUTHOR TERMINAL AND INSTRUCT AUTHOR TERMINAL FOR TRANSFER TO CONTROL CENTER.
S23 REGISTRATION COMPLETION NOTIFIED?
S24 UPDATE BOOK LIST BASED ON NOTIFICATION, EXECUTE FEE-CHARGING PROCESSING FOR CONTRIBUTION ON AUTHOR'S ACCOUNT IN FEE-CHARGING SERVER ON THE BASIS OF TERMINAL ID, AND SEND RESULT THEREOF AND NOTIFICATION OF REGISTRATION COMPLETION TO AUTHOR TERMINAL.
  END
  Control Center
  START ELECTRONIC BOOK MANUFACTURING PROCESSING
S31 MANUSCRIPT DATA TRANSFERRED?
S32 RECEIVE MANUSCRIPT DATA FROM AUTHOR TERMINAL.
S33 GENERATE CONTENTS KEY CORRESPONDING TO TRANSFERRED MANUSCRIPT DATA.
S34 RETREIVE SAMPLE READING DATA.
S35 ADD SAMPLE READIND DATA TO MANUSCRIPT DATA.
S36 USING CONTENTS KEY, ENCRYPT MANUSCRIPT DATA ADDED WITH SAMPLE READING DATA, GENERATE ELECTRONIC BOOK DATA, REGISTER THEM INTO BOOK LIST, AND ALSO UPDATE BOOK LIST OF BOOKSTORE SERVER BASED ON BOOKSTORE DATA.
S37 NOTIFY PUBLISHER SERVER OF REGISTRATION COMPLETION.
  END FIG. 9
  2. <title>I Am Dog</title>
  3. <author>Soseki Akime</author>
  9. <document>I am a dog. I have no name yet.~</document>

FIG. 10
  User Terminal
  START ELECTRONIC BOOK DATA TRANSFER PROCESSING
S51 ACCESS BOOK SERVER BY USE OF TERMINAL ID AND PERSONAL ID TO REQUEST BOOK LIST.
S52 BOOK LIST RECEIVED?
S53 BASED ON BOOK LIST, DISPLAY LIST OF BOOK TITLES.
S54 ELECTRONIC BOOK SELECTED?
S55 REQUEST SAMPLE READING OF SELECTED ELECTRONIC BOOK.
S56 RECEIVE ELECTRONIC BOOK DATA AND ENCRYPTED CONTENTS KEY AND STORE THEM IN SEMICONDUCTOR MEMORY.
  END
  Bookstore Server
  START ELECTRONIC BOOK DATA TRANSFER PROCESSING
S71 BOOK LIST REQUESTED FROM USER TERMINAL?
S72 CHECK TERMINAL ID AND PERSONAL ID AND SEND BOOK LIST TO CORRESPONDING USER TERMINAL.
S73 SAMPLE READING REQUESTED?
S74 REQUEST CONTROL CENTER TO SEND CORRESPONDING ELECTRONIC BOOK DATA TO USER TERMINAL CORRESPONDING TO TERMINAL ID.
  END
  Control Center
  START ELECTRONIC BOOK DATA TRANSFER PROCESSING
S81 TRANSFER OF ELECTRONIC BOOK DATA REQUESTED?
S82 SEARCH FOR CONTENMTS KEY ON THE BASIS OF CUSTOMER DATA.
S83 SEARCH FOR PERSONAL KEY AND ENCRYPT BY USE OF RETREIVED PERSONAL KEY.
S84 SEND ENCRYPTED PERSONAL KEY ELECTRONIC BOOK DATA.
  END FIG. 11
  User Terminal
  START SAMPLE READING PURCHASE PROCESSINFG
S91 PREDETERMINED ELECTRONIC BOOK DATA SELECTED?
S92 DECRYPT, BY PERSONAL KEY, ENCRYPTED CONTENTS KEY CORRESPONDING TO SELECTED ELECTRONIC BOOK DATA.

S93 BY USE OF CONTENTS KEY, DECRYPT ELECTRONIC BOOK DATA.
S94 GET SAMPLE READING DATA.
S95 DISPLAY ELECTRONIC BOOK DATA ON DISPLAY SECTION AND START COUNTING SAMPLE READING TIME.
S96 END OF READING PROGRAM INSTRUCTED?
S97 THE NUMBER OF TURNED-OVER PAGES EQUAL TO THE NUMBER OF PAGES SET IN SAMPLE READING DATA?
S98 WITHIN PRESET ONE SAMPLE RAEDING TIME?
S99 WITHIN PRESET TOTAL SAMPLE READING TIME?
S100 STOP DISPLAYING ELECTRONIC BOOK DATA AND UPDATE INTERGRATED VALUE OF SAMPLE READING TIME.
S101 PURCHASE SELECTED?
S102 REQUEST PURCHASE OF ELECTRONIC BOOK.
S103 COMPLETION OF FEE-CHARGING PROCESSING NOTIFIED?
S104 CLEAR SETTING OF SAMPLE READING.
END
Bookstore Server
START SAMPLE READING PURCHASE PROCESSING
S121 PURCHASE REQUESTED?
S122 EXECUTE FEE-CHARGING PROCESSING CORRESPONDING TO PURCHASE.
S123 NOTIFY USER TERMINAL OF COMPLETION OF FEE-CHARGING PROCESSING.
END
FIG.12
131 MANUSCRIPT DISPLAY BOX
I am a dog.
132 END END BUTTON
133 BUY PURCHASE BUTTON
134 TURN PAGE TURN BUTTON
135 RETURN RETURN BUTTON
136 POINTER

FIG. 13
132 END
133 BUY
134 TURN
135 RETURN

FIG. 14
User Terminal
START PRINTED BOOK PURCHASE PROCESSING
S141 OPERATION FOR PRINTED BOOK PURCHASE REQUEST PERFORMED?
S142 ACCESS CONTROL CENTER BY USE OF TERMINAL ID AND PERSONAL ID TO REQUEST PURCHASE OF PRINTED BOOK.
S143 PRICE INFORMATION OF PRINTED BOOK.
S144 DISPLAY PRICE INFORMATION OF PRINTED BOOK.
S145 TO RETURN ELECTRONIC BOOK DATA?
S146 TELL RETURN OF ELECTRONIC BOOK DATA.
S147 TURN ON SETTING OF SAMPLE READING.
S148 DISPLAY COMPLETION OF DELIVERY ARRANGEMENT.
S149 TELL RETAINING OF ELECTRONIC BOOK DATA.
END
Control Center
START PRINTED BOOK PURCHASE PROCESSING
S161 PURCHASE OF PRINTED BOOK REQUESTED FROM USER TERMINAL?
S162 SEND PRICE INFORMATION OF PRINTED BOOK TO USER TERMINAL.
S163 INSTRUCT BOOKSTORE SERVER TO DELIVER CORRESPONDING PRINTED BOOK AND TELL WHETHER ELECTRONIC BOOK DATA ARE RETURNED OR NOT.
END
Bookstore Server
START PRINTED BOOK PURCHASE PROCESSING
S171 DELIVERY ARRANGEMENT TO PRINTED BOOK DELIVERER SERVER AND EXECUTE FEE-CHARGING PROCESSING.
S173 NOTIFY USER TERMINAL OF COMPLETION OF DELIVERY ARRANGEMENT.
END FIG. 15
User Terminal
START BOOK RAEDING DATA ACCUMULATION PROCESSING
S191 READING PROGRAM WITH ELECTRONIC BOOK DATA SPECIFIED EXECUTED?
S192 COUNT THE NUMBER OF TIMES ELECTRONIC BOOK DATA HAVE BEEN READ AND START COUNTING BOOK READING TIME.
S193 THE ELCTRONIC BOOK DATA LENT OUT?
S194 INCREMENT THE NUMBER OF LENT-OUT TIMES BY 1.
S195 READING PROGRAM ENDED?
S196 PAGE TURNED OVER?
S197 PAGE TURNED OVER TWO OR MORE TIMES?
S198 INCREMENT THE NUMBER OF PAGES TURNED OVER TWO OR MORE TIMES BY 1.
S199 INCREMENT THE NUMBER OF TURNED-OVER PAGES BY 1.
S200 END COUNTING BOOK READING TIME AND RECORD COUNTED TIME.
END FIG. 16
User Terminal
START REVIEWER EVALUATION PROCESSING
S211 PREDETERMINED TIMING REACHED?
S212 RETREIVE ACCUMULATED BOOK READING DATA AND OUTPUT THEM TO BOOKSTORE SERVER.
END
Bookstore Server
START REVIEWER EVALUATION PROCESSING
S231 BOOK READING DATA TRANSFERRED FROM USER TERMINAL?
S232 ATTACH ID FOR IDENTIFYING OWN BOOKSTORE SERVER TO TRANSFERRED USER'S BOOK READING DATA AND OUTPUT TO CONTROL CENTER.
END
Control Center
START REVIEWER EVALUATION PROCESSING
BOOK READING DATA RECEIVED FROM BOOKSTORE SERVER?
RETRIEVE BOOK BOOK READING DATA.
RETRIEVE, FOR EVERY BOOK, BOOK READING TIME PER PAGE, THE NUMBER OF LENT-OUT TIMES, THE NUMBER OF TURNED-OVER PAGES, THE TOTAL NUMBER OF TURNED-OVER PAGES, THE NUMBER OF PAGES, TURNED OVER TWO OR MORE TIMES, AND THE NUMBER OF BOOK READING TIMES.

S254 COMPUTE, FOR EVERY BOOK, AVERAGE OF DEVIATION VALUES OF BOOK READING TIME PER PAGE, THE NUMBER OF LENT-OUT TIMES, THE NUMBER OF TURNED-OVER PAGES, THE TOTAL NUMBER OF TURNED-OVER PAGES, THE NUMBER OF PAGES TURNED OVER TWO OR MORE TIMES, AND THE NUMBER OF BOOK READING TIMES.

S255 FROM OBTAINED AVERAGE DEVIATION VALUE, FOR EVERY BOOK, PERFORM 5-STEP EVALUATION.

S256 OBTAIN ABSOLUTE VALUE OF DIFFERENCE BETWEEN EVALUATION VALUE FOR EVERY REVIEWER AND COMPUTED EVALUATION VALUE TO OBTAIN AVERAGE BY EVALUATION COUNT.

END

FIG. 17
READER'S EVALUATION (R)
AVERAGE DEVIATION VALUE (D)
LESS THAN 35
35 TO LESS THAN 45
45 TO LESS THAN 55
55 TO LESS THAN 65
65 OR MORE

FIG. 18
BOOK A BOOK B BOOK C EVALUATION CAPABILITY VALUE
REVIEWER O
REVIEWER P
REVIEWER Q
REVIEWER R
READER'S EVALUATION

What is claimed is:

1. An information processing system comprising a first information processing apparatus, a second information processing apparatus, and a third information processing apparatus, said first information processing apparatus including:

first storage means for storing electronic book data attached with information of an address on a network of said second information processing apparatus which receives a request for the delivery of a printed book corresponding to an electronic book and a user ID for identifying a user;

display means for displaying said electronic book;

instruction means for instructing the request for the delivery of said printed book corresponding to said electronic book, via a button displayed by said display means along with said electronic book;

first transmission means for transmitting, when the request for the delivery of said printed book corresponding to said electronic book is instructed by said instruction means, said request for the delivery of said printed book and said user ID to said second information processing apparatus corresponding to said address; and first reception means for receiving a notice of the reception of said request for the delivery of said printed book from said third information processing apparatus;

said second information processing apparatus including:

second reception means for receiving the request for the delivery of the printed book corresponding to the electronic book and the user ID for identifying the user sent from said first information processing apparatus;

second storage means for storing personal information including address information of said user corresponding to said user ID;

stock checking means for checking a plurality of said third information processing apparatuses for a stock of said printed book;

selection means for selecting, on the basis of a result of the stock checking by said stock checking means and said address information of said user corresponding to said user ID, any one of said plurality of third information processing apparatuses; and transfer means for transferring said request for the delivery of said printed book and said address information of said user to said selected third information processing apparatus; and said third information processing apparatus including:

third reception means for receiving the request for the delivery of the printed book corresponding to the electronic book and the address of the user transferred from said second information processing apparatus;

third storage means for storing said request for the delivery of said printed book corresponding to said electronic book and said address of said user received by said third reception means; and second transmission means for transmitting, on the basis of said request for the delivery of said printed book and said address of said user stored in said third storage means, a notice indicative of the reception of said request for the delivery of said printed book to said first information processing apparatus.

2. An information processing method for an information processing system including a first information processing apparatus, a second information processing apparatus, and a third information processing apparatus, said information processing method comprising a first method, a second method, and a third method;

said first method, in said first information processing apparatus, including:

firstly storing electronic book data attached with information of an address on a network of said second information processing apparatus which receives a request for the delivery of a printed book corresponding to an electronic book and a user ID for identifying a user;

displaying said electronic book;

instructing the request for the delivery of said printed book corresponding to said electronic book, via a button displayed in said display step along with said electronic book;

firstly transmitting, when the request for the delivery of said printed book corresponding to said electronic book is instructed in said instruction step, said request for the delivery of said printed book and said user ID to said second information processing apparatus corresponding to said address; and firstly receiving a notice of the reception of said request for the delivery of said printed book from said third information processing apparatus;

said second method, in said second information processing apparatus, including:

secondly receiving the request for the delivery of the printed book corresponding to the electronic book and the user TD for identifying the user sent from said first information processing apparatus;

secondly storing personal information including address information of said user corresponding to said user TD; checking a plurality of said third information processing apparatuses for a stock of said printed book;

selecting, on the basis of a result of the stock checking in said stock checking step and said address information of said user corresponding to said user ID, any one of said plurality of third information processing apparatuses; and transferring said request for the delivery of said printed book and said address information of said user to said selected third information processing apparatus; and said third method, in said third information processing apparatus, including:

thirdly receiving the request for the delivery of the printed book corresponding to the electronic book and the address of the user transferred from said second information processing apparatus;

thirdly storing said request for the delivery of said printed book corresponding to said electronic book and said address of said user received in said third reception step; and secondly transmitting, on the basis of said request for the delivery of said printed book and said address of said user stored in said third storage step, a notice indicative of the reception of said request for the delivery of said printed book to said first information processing apparatus.

3. A computer readable medium, including computer program instructions for causing a computer to implement a method of controlling an information processing system including a first information processing apparatus, a second information processing apparatus, and a third information processing apparatus, said method comprising a first method, second method, and third method;

said first method, in said first information processing apparatus including:

firstly storing electronic book data attached with information of an address on a network of said second information processing apparatus which receives a request for the delivery of a printed book corresponding to an electronic book and a user ID for identifying a user; displaying said electronic book;

instructing the request for the delivery of said printed book corresponding to said electronic book, via a button displayed in said display step along with said electronic book;

firstly transmitting, when the request for the delivery of said printed book corresponding to said electronic book is instructed in said instruction step, said request for the delivery of said printed book and said user ID to said second information processing apparatus corresponding to said address; and firstly receiving a notice of the reception of said request for the delivery of said printed book from said third information processing apparatus;

said second method, in said second information processing apparatus, including:

secondly receiving the request for the delivery of the printed book corresponding to the electronic book and the user ID for identifying the user sent from said first information processing apparatus;

secondly storing personal information including address information of said user corresponding to said user ID;

checking a plurality of said third information processing apparatuses for a stock of said printed book; selecting, on the basis of a result of the stock checking in said stock checking step and said address information of said user corresponding to said user ID, any one of said plurality of third information processing apparatuses; and transferring said request for the delivery of said printed book and said address information of said user to said selected third information processing apparatus; and said third method, in said third information processing apparatus, including:

thirdly receiving the request for the delivery of the printed book corresponding to the electronic book and the address of the user transferred from said second information processing apparatus;

thirdly storing said request for the delivery of said printed book corresponding to said electronic book and said address of said user received in said third reception step; and secondly transmitting, on the basis of said request for the delivery of said printed book and said address of said user stored in said third storage step, a notice indicative of the reception of said request for the delivery of said printed book to said first information processing apparatus.

* * * * *